United States Patent
Scholla et al.

(10) Patent No.: US 11,939,147 B1
(45) Date of Patent: Mar. 26, 2024

(54) PROPPANT DELIVERY SYSTEMS AND RELATED METHODS

(71) Applicant: Atlas Sand Company, LLC, Austin, TX (US)

(72) Inventors: Christopher R. Scholla, Austin, TX (US); Alexandra Couture, Leander, TX (US); Dacia Webb, Cedar Park, TX (US)

(73) Assignee: Atlas Sand Company, LLC, Austin, TX (US)

( * ) Notice: Subject to any disclaimer, the term of this patent is extended or adjusted under 35 U.S.C. 154(b) by 0 days.

(21) Appl. No.: 18/305,958

(22) Filed: Apr. 24, 2023

(51) Int. Cl.
*B65D 88/30* (2006.01)
*B65G 65/42* (2006.01)
*B60P 3/22* (2006.01)

(52) U.S. Cl.
CPC ............. *B65D 88/30* (2013.01); *B65G 65/42* (2013.01); *B60P 3/226* (2013.01)

(58) Field of Classification Search
CPC ........ B65G 65/46; B65G 65/42; B65G 65/30; B65D 88/30; B65D 88/32; B60P 3/226
USPC .......................................................... 414/339
See application file for complete search history.

(56) References Cited

U.S. PATENT DOCUMENTS

| | | | |
|---|---|---|---|
| 4,065,006 A | 12/1977 | Barry | |
| 5,356,262 A | 10/1994 | Babienko et al. | |
| 7,093,682 B2 | 6/2006 | Cooper | |
| 8,676,549 B2 | 3/2014 | Weisman et al. | |
| 9,038,828 B2 | 5/2015 | Enenkel | |
| 9,440,785 B2 | 9/2016 | Oren et al. | |
| 9,457,970 B1 | 10/2016 | Zevenbergen et al. | |
| 9,565,799 B1 | 5/2017 | Oren et al. | |
| 9,701,463 B2 | 7/2017 | Oren et al. | |
| 9,862,551 B2 | 1/2018 | Oren et al. | |
| 9,938,093 B2 | 4/2018 | Sherwood et al. | |

(Continued)

FOREIGN PATENT DOCUMENTS

| | | |
|---|---|---|
| WO | 2017044921 | 3/2017 |
| WO | 2021209241 | 10/2021 |

OTHER PUBLICATIONS https://web.archive.org/web/20221130133902/https://maxximindustries.com/sand-equipment/, a web page retrieved using the Wayback Machine and archived by the Internet Archive on Nov. 30, 2022, 6 pages.

(Continued)

*Primary Examiner* — Glenn F Myers
(74) *Attorney, Agent, or Firm* — Norton Rose Fulbright US LLP

(57) ABSTRACT

A method of transporting proppant to a wellsite can comprise transporting a plurality of trailers to a proppant-loading site, each of the trailers comprising one or more containers. At the proppant-loading site, proppant can be loaded into the container(s) of each of first and second ones of the trailers. A long combination vehicle comprising a truck and the first and second trailers can be formed at least by coupling the first trailer to the truck and the second trailer to the first trailer. The long combination vehicle can be driven from the proppant-loading site to the wellsite after proppant is loaded into the container(s) of each of the first and second trailers at the proppant-loading site. Less than 1% of a distance that the long combination vehicle drives from the proppant-loading site to the wellsite can be on a public road.

30 Claims, 20 Drawing Sheets

(56) References Cited

U.S. PATENT DOCUMENTS

| | | |
|---|---|---|
| 9,969,564 B2 | 5/2018 | Oren et al. |
| 10,625,654 B2 | 4/2020 | Hughes et al. |
| 10,661,980 B2 | 5/2020 | Oren et al. |
| 2012/0183379 A1 | 7/2012 | Jones |
| 2013/0164112 A1* | 6/2013 | Oren ............ B65D 90/34 414/800 |
| 2013/0206415 A1* | 8/2013 | Sheesley ............ B65G 65/00 166/308.1 |
| 2014/0305769 A1* | 10/2014 | Eiden, III ............ B65G 65/42 222/173 |
| 2015/0224905 A1* | 8/2015 | Oren ............ B60P 1/52 414/812 |
| 2018/0072491 A1* | 3/2018 | D'Agostino ............ B65B 7/16 |
| 2018/0148269 A1 | 5/2018 | Oren et al. |
| 2019/0087918 A1 | 3/2019 | Lewis et al. |
| 2019/0300291 A1 | 10/2019 | Jones |
| 2020/0096376 A1 | 3/2020 | Stark et al. |
| 2020/0346880 A1 | 11/2020 | Oren |
| 2022/0080479 A1 | 3/2022 | Baker et al. |
| 2022/0081230 A1 | 3/2022 | Hall et al. |

OTHER PUBLICATIONS https://web.archive.org/web/20190718171459/https://www.smart-trucking.com/long-combination-vehicles/, a web page retrieved using the Wayback Machine and archived by the Internet Archive on Jul. 18, 2019; 10 pages.

https://web.archive.org/web/20230228064748/https://www.ontario.ca/page/long-combination-vehicle-program, a web page retrieved using the Wayback Machine and archived by the Internet Archive on Feb. 28, 2023, 4 pages.

https://web.archive.org/web/20230409130818/https://en.wikipedia.org/wiki/Road_train, a web page retrieved using the Wayback Machine and archived by the Internet Archive on Apr. 9, 2023, 19 pages.

* cited by examiner

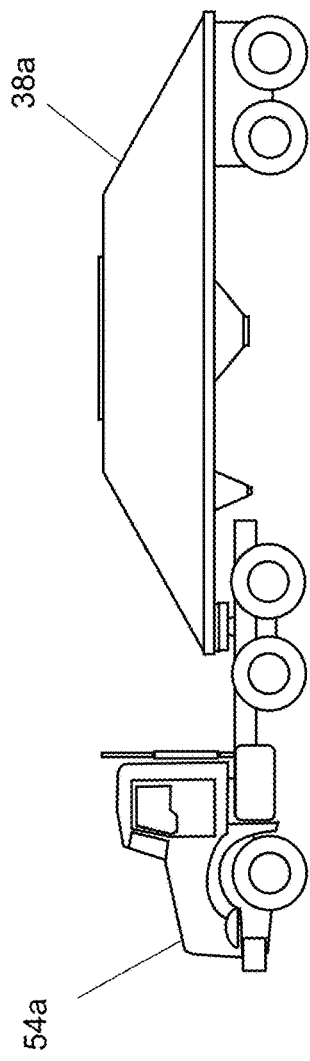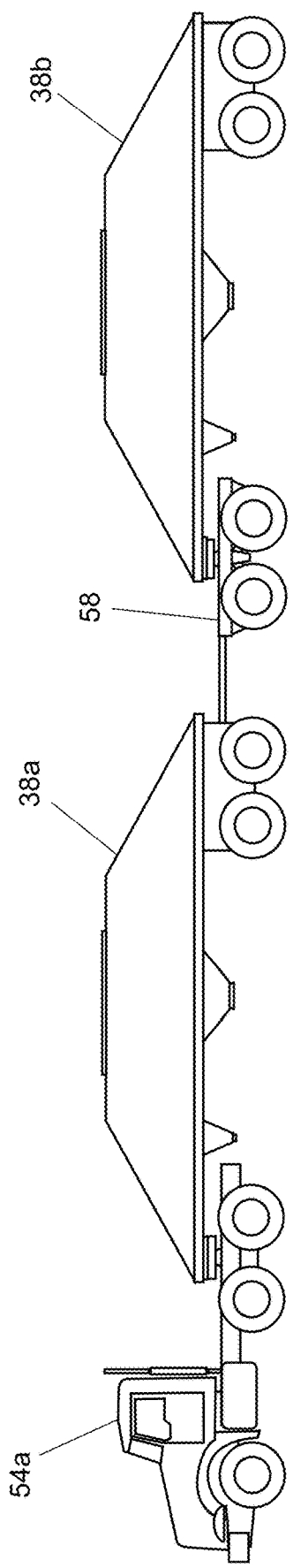

PROPPANT DELIVERY SYSTEMS AND RELATED METHODS

FIELD OF INVENTION

The present invention relates generally to proppant delivery systems and methods of using the same.

BACKGROUND

Petroleum reservoirs can comprise a rock formation that contains hydrocarbons like oil and/or gas. To recover hydrocarbons from the reservoir, a well can be drilled to reach the formation. Some formations, such as those having a low permeability, can be hydraulically fractured by injecting fracking fluid into the well at a high pressure to create fractures in the formation. The fractures can facilitate hydrocarbon production by allowing oil and/or gas to freely flow therethrough. The fracking fluid can contain proppant, such as sand, that holds the fractures open when the hydraulic pressure is removed from the well.

To supply proppant to a wellsite for the fracturing process, proppant can be transported from a proppant source such as a sand mine to the wellsite using, for example, a truck that tows a trailer containing the proppant. The truck may tow the trailer over one or more public roads, such as one or more county, state, or interstate highways, and then over one or more private lease roads to reach the wellsite.

Because the hydraulic fracturing process can require relatively large amounts of proppant, this mode of proppant delivery can face challenges. First, the public road(s) over which the proppant is transferred may include other traffic. With this traffic, transporting heavy loads of proppant over a substantial portion of these public road(s) with a truck and trailer may pose safety risks because a heavy payload may render the truck less maneuverable and impair its ability to accelerate and stop, thereby increasing the risk of collisions with other vehicles. The increased use of hydraulic fracturing may exacerbate these risks, as the demand for more proppant may require more trucks towing proppant-laden trailers to traverse the public roads, thereby increasing congestion and thus the risk of collision on the public roads.

Second, there may be vehicle weight and size restrictions on certain public roads. For example, in the United States of America, the gross vehicle weight—which for a tractor-trailer can include the combined weight of the truck, trailer, and payload—cannot exceed 80,000 pounds on roads that are part of the National Network as defined in 23 C.F.R. § 658.5 and Appendix A to Part 658, with limited exceptions (e.g., permits, which may allow the gross vehicle weight to slightly exceed 80,000 pounds, such as up to 84,000 pounds, on certain roads). State law may also impose similar limits on gross vehicle weight, such as on roads that are part of the National Highway System, even if they are not also part of the National Network.

With these safety concerns and/or weight restrictions on public roads, the amount of proppant contained in a trailer that is towed from a proppant source to the wellsite is typically limited to a level that is significantly less than the truck's towing capacity. The limited proppant payload can impair proppant delivery rates because, with less proppant being carried per haul, less proppant is delivered to the wellsite per day.

SUMMARY

Some of the present proppant delivery systems can be used to safely and legally transport heavier payloads of proppant, such as sand, to a wellsite than in conventional systems to thereby increase proppant delivery rates. Unlike conventional systems in which proppant may be delivered directly from a proppant source to a wellsite over a route that requires substantial travel over one or more public roads, some of the present systems can comprise a proppant-loading site that allows proppant to be transported to the wellsite with little to no travel on a public road, such as a proppant depot disposed at an intermediate location between the proppant source and the wellsite to allow for two stages of proppant delivery. When using such a proppant depot, in the first stage, proppant can be transported to the proppant depot from the proppant source using at least one truck and trailer that drives over one or more public roads, and/or with a conveyor—that can span multiple miles—extending between the proppant source and the proppant depot. For safety and/or to comply with weight restrictions on the public road(s), the truck(s) and trailer(s) transporting proppant to the proppant depot can contain conventional loads of proppant, such as less than or equal to 27 tons of proppant (e.g., such that the gross vehicle weight of each truck and trailer is less than or equal to 80,000 pounds).

In the second stage, proppant can be transported from the proppant depot to the wellsite over a route that includes little, if any, public road; for example, the route to the wellsite from the proppant depot may entirely comprise one or more private roads, such as one or more lease roads. Because the proppant depot is positioned in a location where the route from the proppant depot to the wellsite includes little, if any, public road, a truck driving over that route may safely and legally carry a heavier-than-normal load of proppant. For example, a long combination vehicle comprising a truck and at least two trailers—each of the trailers containing proppant—can be formed and driven from the proppant depot to the wellsite to deliver proppant thereto. While conventional proppant deliveries using a truck and trailer may be less than 27 tons per haul, the use of a long combination vehicle may allow at least 40 tons, such as at least 60, 70, or 100 tons, of proppant to be delivered. By including a proppant depot that is positioned to allow for two stages of proppant delivery, the proppant delivery system can yield faster proppant delivery rates—which may be several times higher—than in conventional systems.

While the proppant-loading site can be an proppant depot at an intermediate location between a proppant source and the wellsite, in some embodiments the proppant-loading site can itself comprise a proppant source, such as a sand mine (e.g., a mobile sand mine) located in a delivery region that allows a truck to safely and legally transport a heavier-than-normal load of proppant from the sand mine to the wellsite with little to no travel on public roads.

Some of the present methods of transporting a wellsite that includes one or more wells comprises transporting a plurality of trailers to a proppant-loading site. Each of the trailers, in some methods, comprise one or more containers. Some methods comprise, at the proppant-loading site, loading proppant into the container(s) of each of first and second ones of the trailers.

In some methods, the proppant-loading site is a proppant depot. In some methods, for each of the first and second trailers, the container(s) of the trailer contain proppant when the trailer is transported to the proppant depot and before proppant is loaded into the container(s) at the proppant depot. For each of the first and second trailers, in some methods, a weight of proppant in the container(s) of the trailer before proppant is loaded into the container(s) at the proppant depot is between 10 and 27 tons. In some methods, for each of the first and second trailers, a weight of proppant in the container(s) of the trailer after proppant is loaded into the container(s) at the proppant depot is greater than or equal to 30 tons.

The container(s) of a third one of the trailers, in some methods, contain proppant when the third trailer is transported to the proppant depot. In some methods, loading proppant into the container(s) of each of the first and second trailers at the proppant depot comprises transferring proppant from at least one of the container(s) of the third trailer to the container(s) of each of the first and second trailers. A weight of proppant in the container(s) of the third trailer before proppant is transferred from at least one of the container(s) of the third trailer to the container(s) of each of the first and second trailers, in some methods, is between 10 and 27 tons.

In some methods, each of the container(s) of each of the trailers comprises a lower gate movable between an open state in which proppant is permitted to exit the container downwardly through the lower gate and a closed state in which proppant is not permitted to exit the container through the lower gate. In some of such methods, transferring proppant from at least one of the container(s) of the third trailer to the container(s) of each of the first and second trailers comprises, for at least one of the container(s) of the third trailer, moving the lower gate of the container from the closed state to the open state such that proppant exits the container, and for each of the container(s) of each of the first and second trailers, conveying proppant from the third trailer upward on a conveyor such that the proppant is conveyed off the conveyor and falls into the container.

In some methods, each of the container(s) of each of the trailers comprises an upper gate movable between an open state in which proppant is permitted to enter the container downwardly through the upper gate and a closed state in which proppant is not permitted to enter the container through the upper gate. In some of such methods, transferring proppant from at least one of the container(s) of the third trailer to the container(s) of each of the first and second trailers comprises, for each of the container(s) of each of the first and second trailers, moving the upper gate of the container from the closed state to the open state such that the proppant conveyed off the conveyor falls into the container through the upper gate.

Some methods comprise forming a long combination vehicle that includes a truck and the first and second trailers at least by coupling the first trailer to the truck and the second trailer to the first trailer. In some methods, the truck of the long combination vehicle is a first truck and when a third one of the trailers is transported to the proppant depot, the third trailer is coupled to a second truck and the container(s) of the third trailer contain proppant. In some of such methods, loading proppant into the container(s) of each of the first and second trailers at the proppant depot comprises transferring proppant from the container(s) of the third trailer to a silo while the third trailer is coupled to the second truck and transferring proppant from the silo to the container(s) of each of the first and second trailers while the first trailer is coupled to the first truck and the second trailer is coupled to the first trailer.

Some methods comprise driving the long combination vehicle from the proppant-loading site to the wellsite after proppant is loaded into the container(s) of each of the first and second trailers at the proppant-loading site. In some methods, when the long combination vehicle drives from the proppant-loading site to the wellsite less than 1% of a distance that the long combination vehicle drives is on a public road. In some methods, the long combination vehicle does not drive on a public road when the long combination vehicle drives from the proppant-loading site to the wellsite. In some methods, the proppant-loading site and the wellsite are in the United States of America and when the long combination vehicle drives from the proppant-loading site to the wellsite, the long combination vehicle does not drive on a road that is part of the National Network and does not drive on a road that is part of the National Highway System. In some methods, when the long combination vehicle drives from the proppant-loading site to the wellsite, for each of the first and second trailers, a weight of proppant in the container(s) of the trailer is greater than 20 tons, optionally greater than or equal to 30 tons.

In some methods, the wellsite is a first one of a plurality of wellsites, optionally between 5 and 50 wellsites, that each include one or more wells. In some of such methods, the wellsites and the proppant-loading site are disposed in a delivery region, wherein one or more public roads are disposed along at least a majority of a perimeter of the delivery region. An area of the delivery region, in some methods, is between 200 and 1800 square miles. In some methods, when the long combination vehicle drives from the proppant-loading site to the wellsite, the long combination vehicle remains within the delivery region.

Some of the present proppant delivery systems comprise a plurality of trailers. Each of the trailers, in some systems, comprise one or more containers configured to hold proppant. In some systems, a payload capacity of the container(s) of each of the trailers is at least 30 tons. A payload capacity of the container(s) of each of the trailers, in some systems, is within 10% of the payload capacity of the container(s) of each other of the trailers. Each of the trailers, in some systems, is configured to be coupled to at least one other of the trailers.

In some systems, each of the container(s) of each of the trailers comprises a lower gate movable between an open state in which proppant is permitted to exit the container downwardly through the lower gate and a closed state in which proppant is not permitted to exit the container through the lower gate. Each of the container(s) of each of the trailers, in some systems, comprises an upper gate movable between an open state in which proppant is permitted to enter the container downwardly through the upper gate and a closed state in which proppant is not permitted to enter the container through the upper gate.

Some systems comprise a plurality of trucks, each configured to be coupled to one of the trailers.

Some systems comprise a proppant depot. The proppant depot, in some systems, is configured to contain multiple ones of the trailers and multiple ones of the trucks. In some systems, the proppant depot is disposed in a delivery region. The delivery region, in some systems, has a plurality of wellsites, optionally between 5 and 50 wellsites, that each include one or more wells. In some systems, the delivery region includes a plurality of routes along which the trucks can drive between the proppant depot and the wellsites. In some systems, for each of the routes less than 1% of a distance of the route is on a public road, and in some systems each of the routes does not include a portion of a public road. In some systems, the delivery region is in the United States of America and each of the routes does not include a portion of a road that is part of the National Network and does not include a portion of a road that is part of the National Highway System.

In some systems, one or more public roads are disposed along at least a majority of a perimeter of the delivery region. None of the routes, in some systems, include a portion of the public road(s) that are disposed along at least a majority of the perimeter of the delivery region. An area of the delivery region, in some systems, is between 200 and 1800 square miles.

Some systems comprise one or more conveyors disposed at the proppant depot. Each of the conveyor(s), in some systems, is configured to transfer proppant from one of the trailers to another one of the trailers. In some systems, the proppant depot comprises one or more silos.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "about" may be substituted with "within [a percentage] of" what is specified, where the percentage includes 0.1, 1, 5, and 10 percent.

The terms "comprise" and any form thereof such as "comprises" and "comprising," "have" and any form thereof such as "has" and "having," and "include" and any form thereof such as "includes" and "including" are open-ended linking verbs. As a result, a product or system that "comprises," "has," or "includes" one or more elements possesses those one or more elements but is not limited to possessing only those elements. Likewise, a method that "comprises," "has," or "includes" one or more steps possesses those one or more steps but is not limited to possessing only those one or more steps.

Any embodiment of any of the products, systems, and methods can consist of or consist essentially of—rather than comprise/have/include—any of the described steps, elements, and/or features. Thus, in any of the claims, the term "consisting of" or "consisting essentially of" can be substituted for any of the open-ended linking verbs recited above in order to change the scope of a given claim from what it would otherwise be using the open-ended linking verb.

Further, a device or system that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIG. 3B is a side view of one of the trucks of FIG. 3A coupled to one of the trailers of FIG. 2A.

FIG. 3C is a side view of one of the present long combination vehicles that can comprise one of the trucks of FIG. 3A coupled to the first trailer of FIG. 2A and the second trailer of FIG. 2A coupled to the first trailer using a dolly.

DETAILED DESCRIPTION

Figure 1:
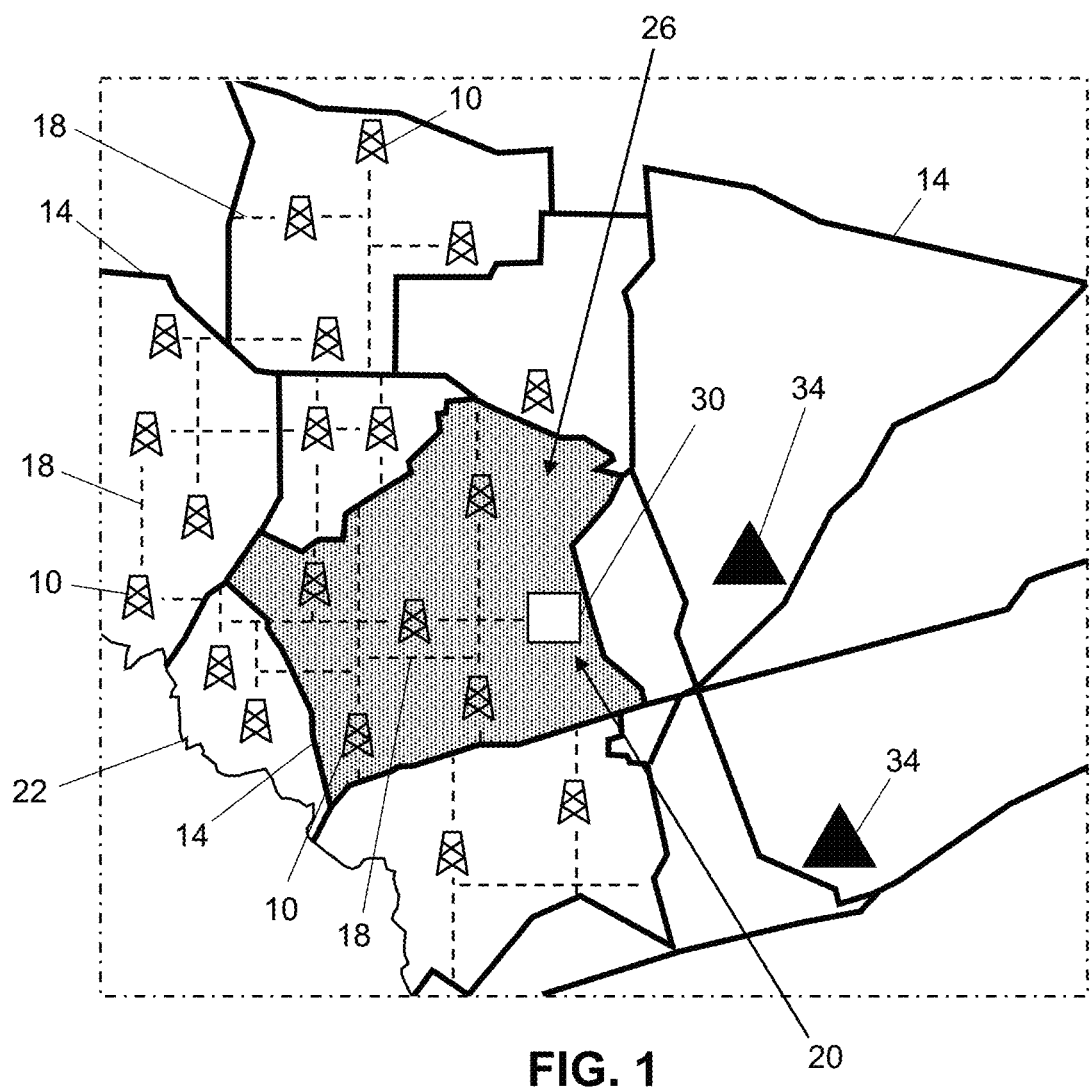
FIG. 1 illustrates an area that contains at least one component of one of the present proppant delivery systems and in which there is at least one petroleum reservoir containing oil and/or gas. In the depicted embodiment, there are a plurality of routes in a delivery region between the proppant depot and wellsites in the delivery region that do not include a portion of a public road.

Referring to FIG. 1, shown is an area that contains at least one component of one of the present proppant delivery systems 20. The area can include at least one petroleum reservoir containing oil and/or gas, as well as a plurality of wellsites 10 that each have one or more wells to produce petroleum (e.g., oil and/or gas) from one of the reservoir(s). To permit or facilitate petroleum production, the well(s) of at least one of wellsites 10 can be hydraulically fractured, and proppant, such as sand, can be used when hydraulically fracturing the well(s). As shown, the area can include one or more (e.g., a plurality of) public roads 14 (represented as bold solid lines) and one or more (e.g., a plurality of) private roads 18 (represented as dashed lines). Public road(s) 14 can comprise, for example, one or more county, state, and/or interstate highways; when the area is in the United States of America, at least one of the public road(s) can be part of the National Network as defined in 23 C.F.R. § 658.5 and Appendix A to Part 658 and/or part of the National Highway System designated under the National Highway System Designation Act of 1995 (P.L. 104-59). Private road(s) 18 can connect wellsites 10 to public road(s) 14 and can comprise, for example, one or more lease roads; proppant can thus be transported from one or more proppant sources 34 (e.g., one or more sand mines) to the wellsites over the public and private roads.

System 20 can facilitate the delivery of proppant (e.g., sand) to multiples ones of wellsites 10 to achieve faster delivery rates than those attainable with conventional systems, while mitigating safety risks on public road(s) 14. As shown, system 20 can comprise a proppant-loading site 30 disposed in a delivery region 26 (represented as a shaded area) that includes a plurality of wellsites 10, such as greater than or equal to any one of, or between any two of, 5, 10, 12, 14, 16, 18, 20, 30, 40, or 50 wellsites, where each of the wellsites includes one or more wells for which proppant is needed. Delivery region 26 can be large enough to contain such a number of wellsites; for example, an area of the delivery region can be greater than or equal to any one of, or between any two of, 200, 400, 600, 800, 1000, 1200, 1400, 1600, 1800, 2000, 3000, or 4000 square miles (e.g., between 200 and 1800 square miles). Proppant-loading site 30 can comprise a proppant depot; while in conventional systems proppant may be delivered directly to wellsites 10 from at least one proppant source 34 over a substantial portion of one or more public roads 40, system 20's proppant depot can serve as an intermediate location between the source(s) and the wellsites to allow for two stages of proppant delivery.

For the first stage of proppant delivery, proppant depot 30 can be positioned such that proppant can be transported from proppant source(s) 34 to the depot. For example, one or more public roads 14 can be disposed along at least a portion of the perimeter of delivery region 26, such as along at least 50%, 60%, 70%, 80%, or 90% (up to and including all) of the delivery region's perimeter, to allow access to proppant depot 30 from at least one of the public road(s). There can thus be one or more routes between each proppant source 34 and proppant depot 30 over which proppant can be transported (e.g., using a truck that can drive between the source and depot along the route(s)), with at least a majority (up to and including substantially all) of the distance of each route being on one or more public roads 14. Additionally or alternatively, for at least one proppant source 34, there can be a conveyor (e.g., having a length that is multiple miles) that extends between the source and proppant depot 30 such that the conveyor can convey proppant from the source to the depot.

For the second stage of proppant delivery, delivery region 26 can have a plurality of routes between proppant depot 30 and the delivery region's wellsites 10 over which proppant can be transported (e.g., using a truck that can drive between the depot and wellsites along the routes). Little to none of each the routes between proppant depot 30 and delivery region 26's wellsites 10 can be on a public road, e.g., with each of the routes being entirely or almost entirely on one or more private roads 18. For example, for each of the routes between proppant depot 30 and delivery region 26's wellsites 10, less than or equal to any one of, or between any two of, 1%, 0.9%, 0.8%, 0.7%, 0.6%, 0.5%, 0.4%, 0.3%, 0.2%, 0.1%, 0.05%, or 0.01% (down to and including none) (e.g., less than or equal to 0.1% or 0.01%) of a distance of the route can be on a public road 14. In the embodiment shown, each of the routes does not include a portion of a public road 14; however, as described in further detail below, in other embodiments at least one of the routes may include a small portion of a public road, such as a crossing over a public road that is disposed between two private roads 18.

The two stages of proppant delivery can facilitate safe proppant delivery and allow more proppant to be delivered to delivery region 26's wellsites 10 per day. Public road(s) 14 may have more traffic than private road(s) 18 such that vehicles with heavy loads, which are less maneuverable and harder to stop, may pose safety risks on the public road(s). Furthermore, public road(s) 14 may be subject to vehicle weight restrictions. Accordingly, as described in further detail below, in the first stage of proppant delivery, only conventional loads of proppant can be transported to proppant depot 30 on public road(s) 14, or the public road(s) can be bypassed using the above-described source-to-depot conveyor, to promote safety. However, in the second stage of proppant delivery, where the routes between proppant depot 30 and delivery region 26's wellsites 10 allow proppant to be delivered with little to no travel on public road(s) 14, heavier loads of proppant that would pose safety risks or be prohibited when transported on non-negligible lengths of public road can be transported to the wellsites to increase the rate at which proppant is delivered.

While in the embodiment shown proppant-loading site 30 comprises a proppant depot, in other embodiments the proppant-loading site can itself comprise a proppant source such as a mobile sand mine positioned in delivery region 26. With such a proppant-loading site 30, the first stage of proppant delivery from proppant source(s) 34 to the proppant-loading site over public road(s) 14 would not be required, as a proppant-loading site comprising a proppant source can be used to generate proppant for delivery over the routes that are entirely or almost entirely on private road(s) 18. This likewise allows heavier-than-normal loads of proppant to be safely and legally delivered to wellsites 10 to increase the rate at which proppant is delivered.

Figure 2A:
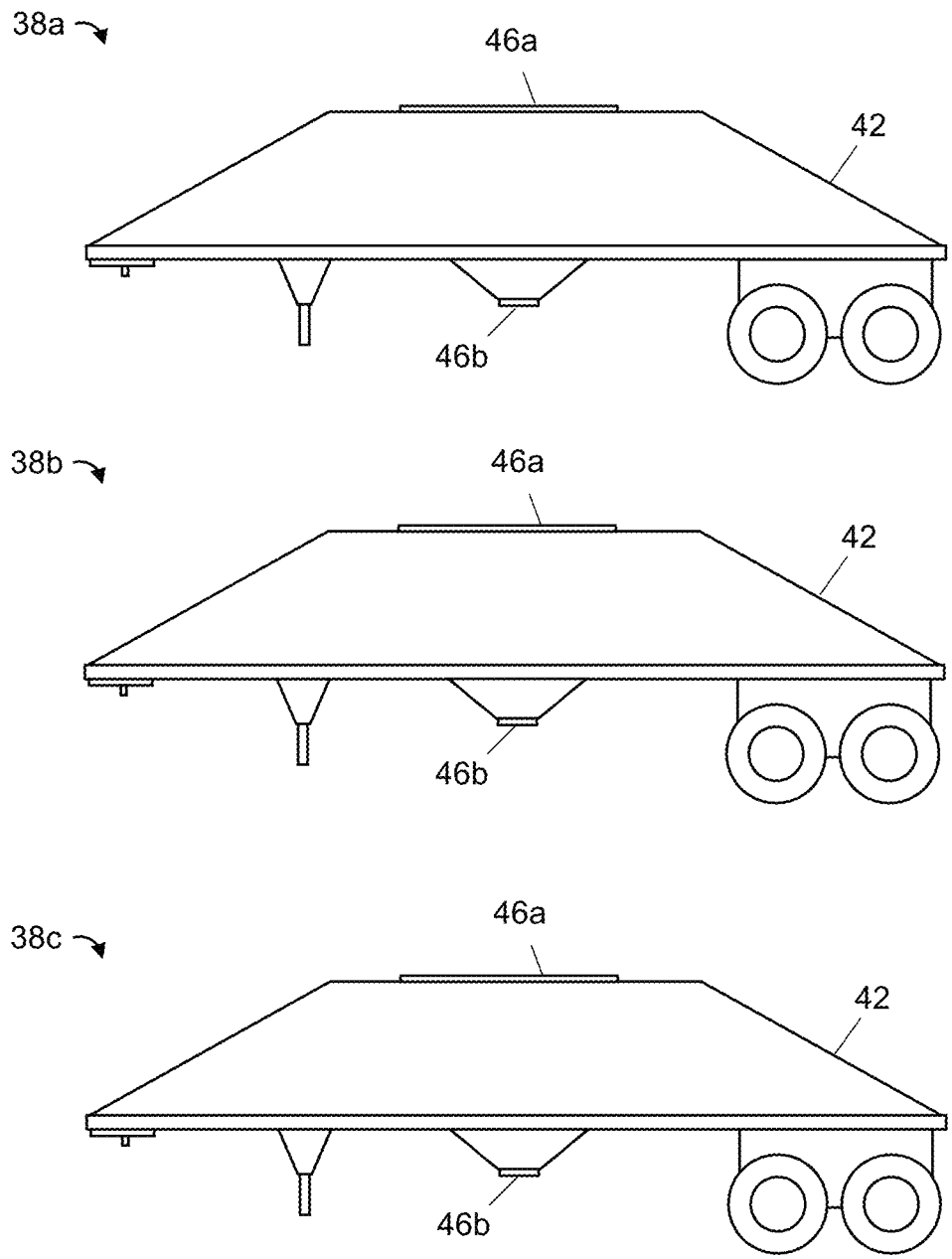
FIG. 2A is a side view of first, second, and third trailers that can be used in some of the present systems and that can each comprise one or more containers configured to hold proppant.
Figure 2B:
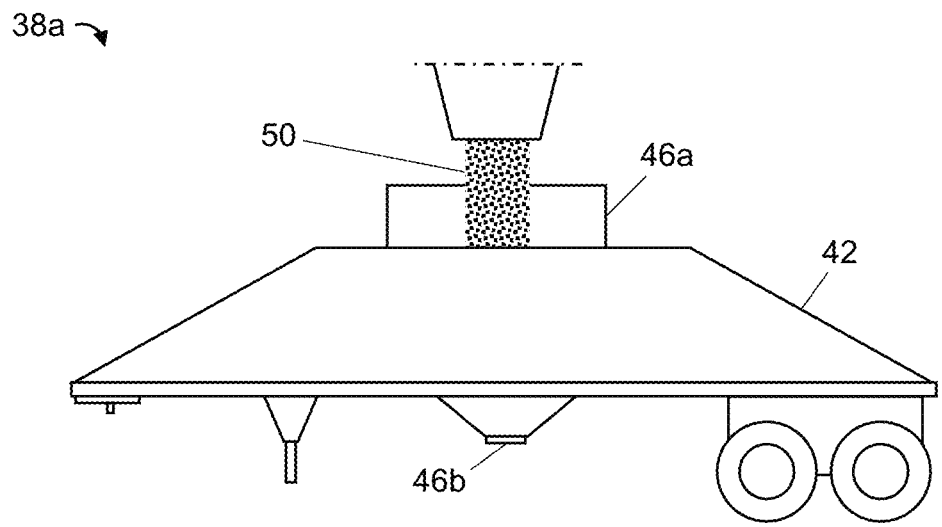
FIG. 2B is a side view of one of the trailers of FIG. 2A and illustrates an upper gate of the trailer's container in an open position, with proppant being loaded into the container through the upper gate.
Figure 2C:
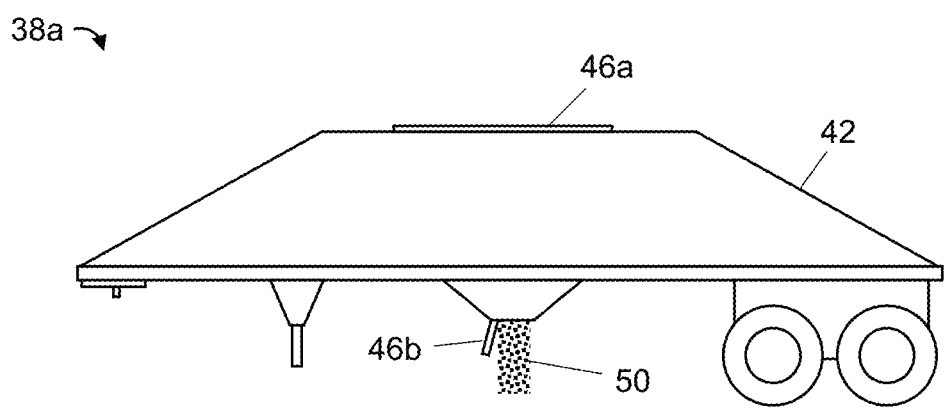
FIG. 2C is a side view of one of the trailers of FIG. 2A and illustrates a lower gate of the trailer's container in an open position, with proppant being discharged from the container downwardly through the lower gate.

Referring to FIGS. 2A-2C, to allow the transport of proppant from proppant-loading site 30 to delivery region 26's wellsites 10, and optionally from proppant source(s) 34 to the proppant-loading site, system 20 can comprise a plurality of trailers 38a-38c, such as greater than or equal to any one of 2, 3, 4, 5, 6, 7, 8, 9, or 10 trailers. As shown, system 20 comprises at least first, second, and third trailers 38a, 38b, and 38c. Each of trailers 38a-38c can comprise one or more containers 42 configured to hold proppant 50; while in the depicted embodiment each trailer has a single container that can be fixed to a frame of the trailer, in other embodiments each trailer can have multiple containers and/ or one or more containers removably coupled to the trailer's frame (e.g., the trailer can be a flatbed trailer with one or more containers removably disposed on a deck thereof). A payload capacity of container(s) 42 (e.g., a maximum weight of proppant 50 that the container(s) can collectively hold) of each of trailers 38a-38c is preferably higher than that of conventional container(s) to allow for heavier loads during the second stage of proppant delivery in delivery region 26; for example, the payload capacity of the container(s) of each trailer can be greater than or equal to any one of, or between any two of, 28, 29, 30, 31, 32, 33, 34, 35, 36, 37, 38, 39, or 40 tons (e.g., greater than or equal to 30 tons or greater than or equal to 35 tons).

Each of container(s) 42 of each of trailers 38a-38c can comprise an upper gate 46a and/or a lower gate 46b to allow proppant 50 to be loaded into and out of the container. Upper gate 46a can be movable (e.g., pivotable or slidable) between an open state (FIG. 2B) and a closed state (FIG. 2C). When upper gate 46a is in the open state, proppant 50 is permitted to enter container 42 downwardly through the upper gate, and when the upper gate is in the closed state proppant is not permitted to enter (or exit) the container therethrough. Upper gate 46a can thus be moved to the open state to load proppant 50 into container 42 and can be moved to the closed state during transport to mitigate proppant losses.

Lower gate 46b likewise can be movable (e.g., pivotable or slidable) between an open state (FIG. 2C) and a closed state (FIG. 2B). When lower gate 46b is in the open state, proppant 50 is permitted to exit container 42 downwardly through the lower gate, and when the lower gate is in the closed state proppant is not permitted to exit the container therethrough. Lower gate 46b can thus be moved to the open state to unload proppant 50 from container 42 and can be moved to the closed state to keep proppant in the container.

Figure 3A:
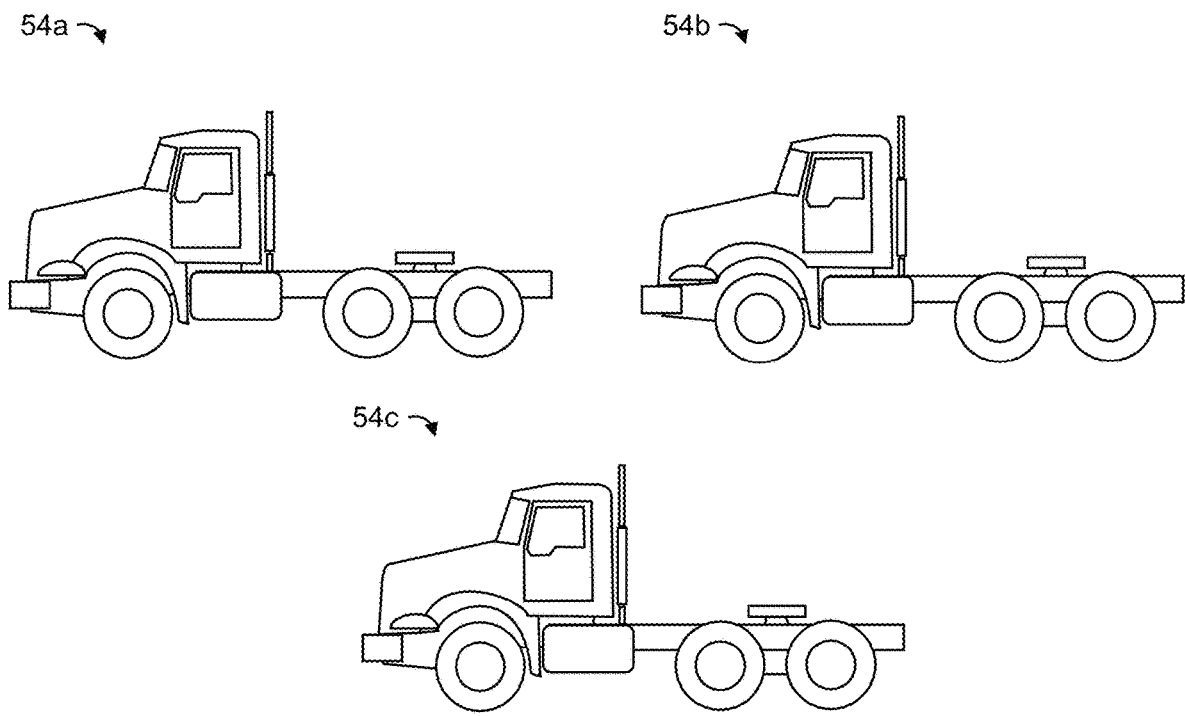
FIG. 3A is a side view of a plurality of trucks that can be used in some of the present systems and that can each be coupled to one of the trailers of FIG. 2A to transport the trailer.

Referring further to FIGS. 3A-3C, system 20 can also comprise a plurality of trucks 54a-54c, such as greater than or equal to any one of 2, 3, 4, 5, 6, 7, 8, 9, or 10 trucks. As shown, system 20 can comprise at least first, second, and third trucks 54a-54c (e.g., one for each of trailers 38a-38c). Each of trucks 54a-54c can be configured to be coupled to one of trailers 38a-38c, such as via a fifth-wheel coupling, such that the truck can tow the trailer for proppant transport (FIG. 3B). Additionally, each of trailers 38a-38c can be configured to be coupled to at least one, optionally two, other of the trailers (FIG. 3C). For example, system 20 can comprise a plurality of dollies 58, and each dolly can be coupled to a rear of one of trailers 38a-38c (e.g., via a rear pintle hook on the trailer) and another one of the trailers can be coupled to the dolly (e.g., via a fifth-wheel coupling) such that the trailers are coupled together via the dolly. In this manner, system 20 can allow for the formation of a long combination vehicle 60 that comprises one of trucks 54a-54c and at least two of trailers 38a-38c such that one truck can tow multiple trailers. Furthermore, each of trailers 38a-38c can be substantially the same size (e.g., with a payload capacity of container(s) 42 of each of the trailers being within 10% of the payload capacity of the container(s) of each other of the trailers) such that, unlike in conventional long combination vehicles, all trailers that are part of long combination vehicle 60 can have substantially the same (e.g., a higher-than-normal) payload capacity to promote faster proppant delivery rates. While such a long combination vehicle 60 may pose safety risks and/or be prohibited on certain public roads 14—and accordingly was not a feasible option in conventional systems—those issues are inapplicable in the second stage of proppant delivery in system 20 where the routes to wellsites 10 require little to no travel on public roads. Long combination vehicle 60 is thus a feasible option to allow more proppant to be transported to a wellsite 10 with each haul within delivery region 26.

Figure 4:
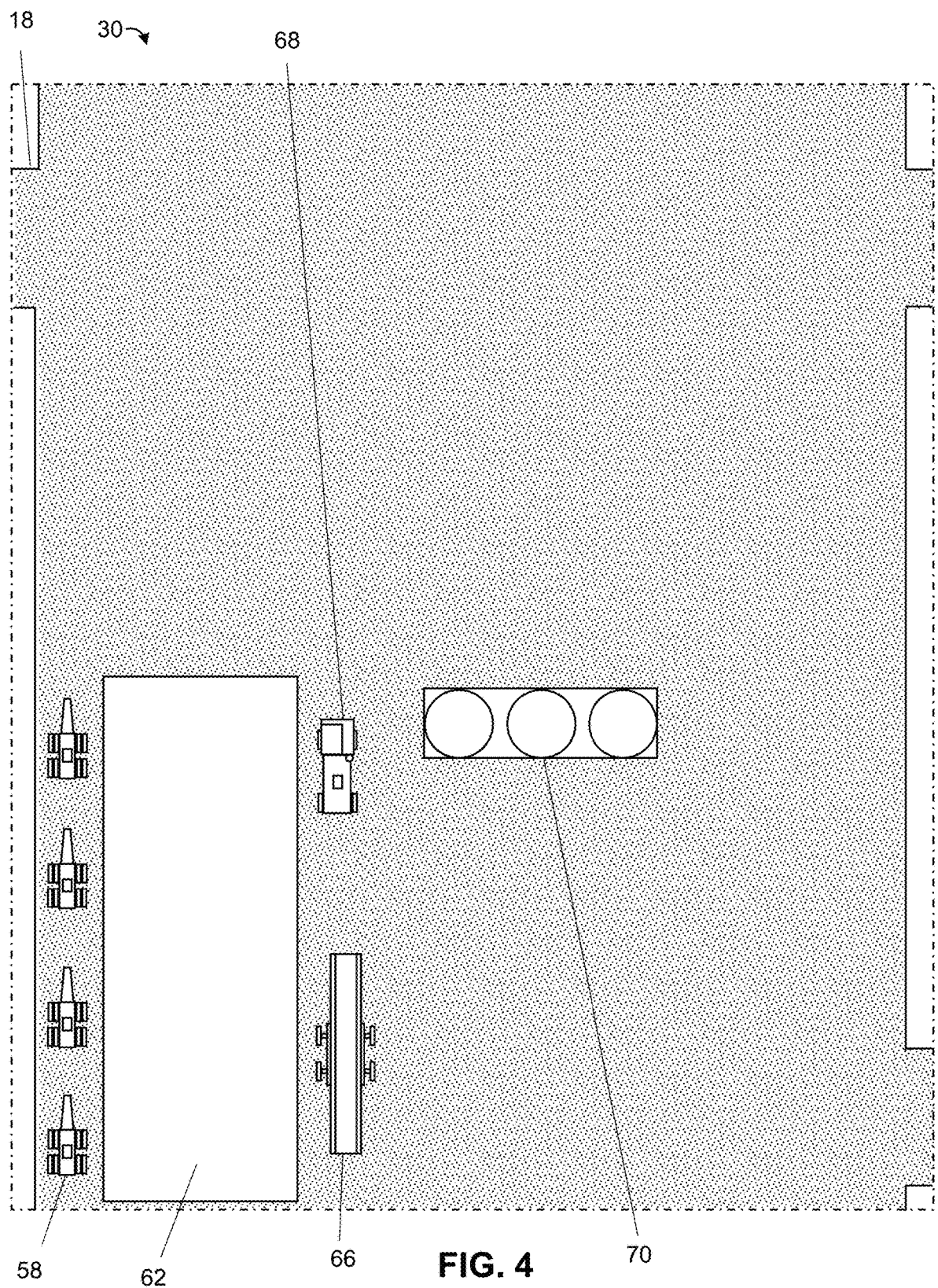
FIG. 4 is a top view of a proppant depot of some of the present systems that can comprise a trailer storage area, a conveyor, a silo, a terminal tractor, and one or more dollies used to form a long combination vehicle.

Referring to FIG. 4, shown is proppant-loading site 30 that comprises a proppant depot. Proppant depot 30 can be configured to contain multiple ones of trailers 38a-38c, such as at least 2, 3, 4, 5, 6, 7, 8, 9, or 10 of the trailers, and multiple ones of trucks 54a-54c, such as at least 2, 3, 4, 5, 6, 7, 8, 9, or 10 of the trucks. For example, proppant depot 30 can be large enough to permit multiple trucks 54a-54c, each with at least one or (for a long combination vehicle 60) two trailers 38a-38c connected thereto, to drive therein. Trucks 54a-54c can thus tow trailers 38a-38c into proppant depot 30, where proppant can be loaded into and/or transferred from the trailers as described in further detail below.

For proppant transfer and/or storage in proppant depot 30, system 20 can comprise one or more conveyors 66 and/or one or more silos 70 disposed in the proppant depot. Each conveyor 66 can be configured to transfer proppant from one of trailers 38a-38c (e.g., by receiving proppant that exits lower gate 46b of at least one of the trailer's container(s) 42) to another one of the trailers (e.g., by conveying proppant upward where it can fall off the conveyor and through upper gate 46a of at least one of the other trailer's container(s)) and/or to silo(s) 70 for storage. In such a transfer and/or in another of the other transfers described herein, one or more chutes and/or other dust-mitigation technologies may be used. Furthermore, each of conveyor(s) 66 can be movable such that proppant transfer can be carried out at different positions in proppant depot 30 and so the conveyor can be stored when not in use, which affords flexibility in space utilization. Illustrative conveyor(s) 66 that can be used in proppant depot 30 include the Models 1850 and 2450 belt conveyors from Rail Barge Truck Services, Inc in Elizabethtown, Kentucky; however, any other suitable conveyor(s) can be used for the proppant transfer. Each of silo(s) 70 can comprise at least one container that can hold proppant and that can be configured to release proppant and to permit each of trailers 38a-38c to be towed under the silo (e.g., using one of trucks 54a-54c). Accordingly, with one of trailers 38a-38c under one of silo(s) 70, the silo can release proppant such that proppant exits the silo and falls into at least one of container(s) 42 of the trailer (e.g., through upper gate 46a of the trailer) for transport to one of wellsites 10 in delivery region 26.

As shown, proppant depot 30 can comprise a trailer storage area 62 that is sized to hold a plurality of trailers 38a-38c such that trailers loaded with proppant in the depot can be stored until they are transported to wellsites 10; the trailer storage area optionally comprises a cover that overlies trailers disposed in the storage area to help protect the trailers from the elements.

Proppant depot 30 can also contain one or more dollies 58 that can be used to form a long combination vehicle 60 as described above. With one or more dollies 58 in proppant depot 30, each of trailers 38a-38c can be transported to the proppant depot over public road(s) 14 in a single tractor-trailer configuration (e.g., with a single trailer towed by one of trucks 54a-54c) for safety, and then at least one of the trailers can be coupled to another one of the trailers in the proppant depot using one of the one or more dollies to form long combination vehicle 60 that can then tow multiple trailers—and the proppant contained therein—to a wellsite 10 in delivery region 26 with little to no travel on the public road(s).

While proppant depot 30 can be sized to permit trucks 54a-54c to tow trailers 38a-38c into and out of the proppant depot, the proppant depot preferably comprises a terminal tractor 68 that can be configured to be coupled to one of the trailers (e.g., using a fifth-wheel coupling)—and optionally to other movable components in the proppant depot, such as to a conveyor 66 or a dolly 58—to move the trailer (or other component) within the proppant depot to a location for proppant transfer into or out of the trailer, into trailer storage area 62, or to a location to form long combination vehicle 60. Terminal tractor 68 may be better suited to move such components within the confines of proppant depot 30 than trucks 54a-54c because it can have a shorter wheelbase, allow easier access to trailer connections from the cab, have a larger field of view from the cab, and/or the like.

Referring to FIGS. 5A and 5B, 6A-6D, 7A-7C, and 8A and 8B, illustrated are some of the present methods of transporting proppant to a wellsite (e.g., 10)—which can be a first one of a plurality of wellsites in a delivery region (e.g., 26)—that includes one or more wells. While the illustrated methods are described with reference to system 20, the system is not limiting on those methods, which can be performed using any suitable system.

Figure 5A:
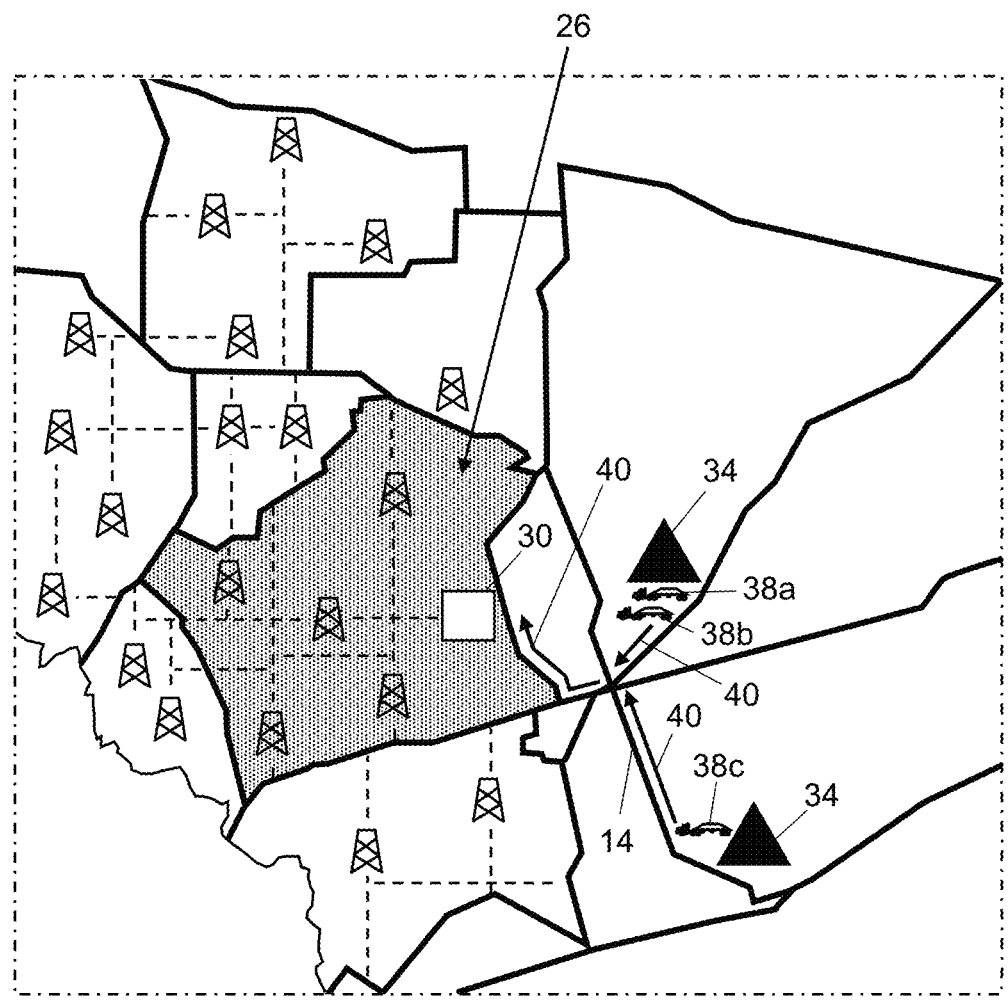
FIGS. 5A and 5B illustrate the transportation of a plurality of trailers from one or more proppant sources to the proppant depot in some of the present methods.
Figure 5B:
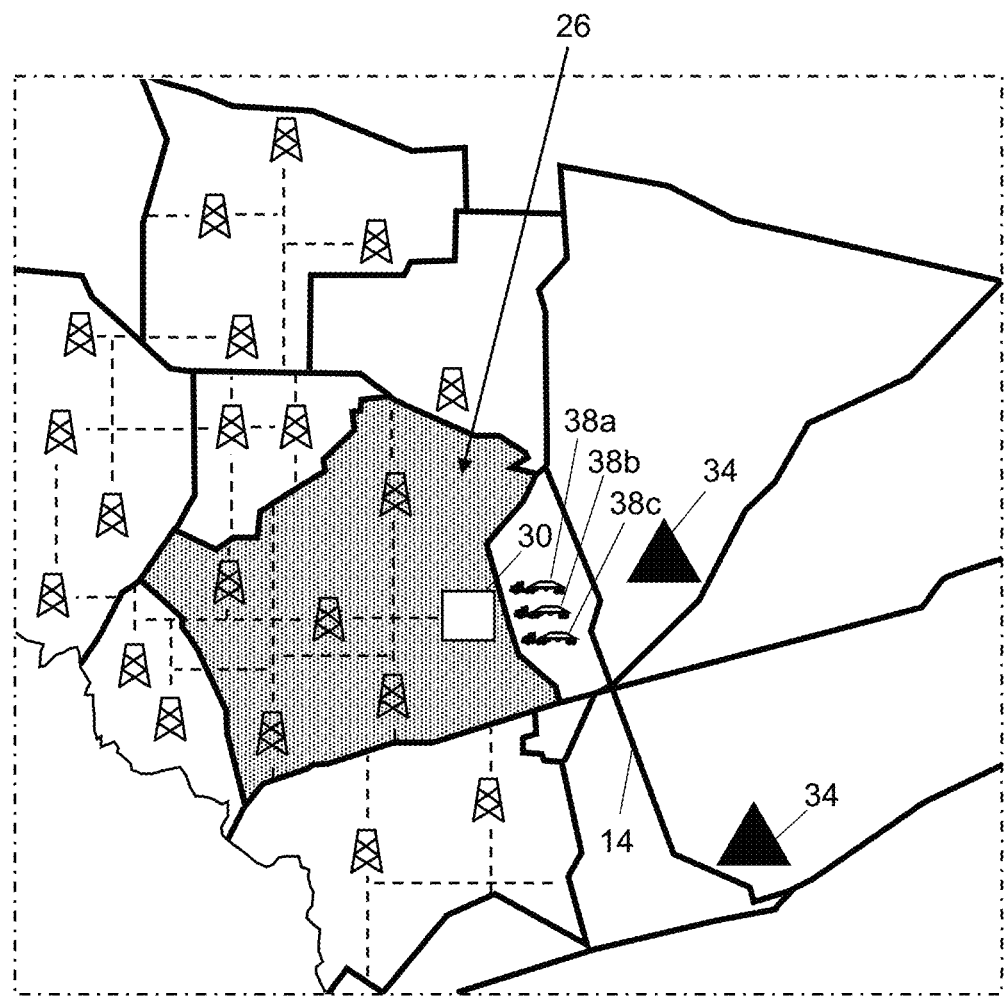

Turning first to FIGS. 5A and 5B, some methods comprise a step of transporting a plurality of trailers (e.g., 38a-38c) that each comprise one or more containers (e.g., 42) as described above to a proppant-loading site (e.g., 30), such as a proppant depot or a proppant source as described above, that can be disposed in the delivery region. The trailers can be transported to the proppant-loading site using a plurality of trucks (e.g., 54a-54c), which can each tow at least one of the trailers to the proppant-loading site. As shown, two or more of the trailers—such as at least first, second, and third ones of the trailers—can each be transported from a proppant source (e.g., 34) like a sand mine to the proppant-loading site (e.g., proppant depot, in the depicted embodiment) along a route that, as described above and as represented by arrows 40, is mostly or entirely on one or more public roads (e.g., 14). Each of the trailers (e.g., the first, second, and third trailers) from the proppant source can contain proppant when transported to the proppant-loading site (e.g., proppant depot). For safety and/or to comply with weight restrictions on the public road(s), the container(s) of each of the trailers can carry a conventional amount of proppant during this first stage of proppant delivery, such as less than or equal to any one of, or between any two of, 27, 26, 25, 24, 23, 22, 21, 20, 19, 18, 17, 16, 15, 14, 13, 12, 11, or 10 tons of proppant, and each of the trailers can remain uncoupled from any other of the trailers (e.g., such that each truck tows a single trailer from the proppant source to the proppant-loading site). A gross vehicle weight of each truck and the trailer connected thereto (which can include the total weight of the truck, trailer, and proppant in the trailer) can thus be less than or equal to 80,000 pounds, which can allow transport on, for example, public road(s) that are part of the National Network, the National Highway System, and/or the like without a permit. In other embodiments, however, one or more (e.g., two or more) of the trailers need not contain proppant when transported to the proppant-loading site and/or need not come from the proppant source. For example, transporting the trailers to the proppant-loading site can comprise transporting at least the first and second trailers from one of the wellsites in the delivery region to the proppant-loading site (e.g., as part of a long combination vehicle (e.g., 60)) after proppant is unloaded from the container(s) of each of the first and second trailers at that wellsite (e.g., such that the amount of proppant remaining in the container(s) is less than or equal to 10% of the payload capacity of the container(s)). Transporting such unloaded trailers to the proppant-loading site allows the trailers to be refilled with proppant for another delivery.

While, as explained in further detail below, one or more (up to and including each) of the trailers transported to the proppant-loading site can remain coupled to one of the trucks (e.g., directly or via another trailer and/or dolly (e.g., 58) coupled to the truck), in other embodiments one or more (up to and including each) of the trailers can be decoupled from the truck at the proppant-loading site and moved with, for example, a terminal tractor (e.g., 68).

Figure 6A:
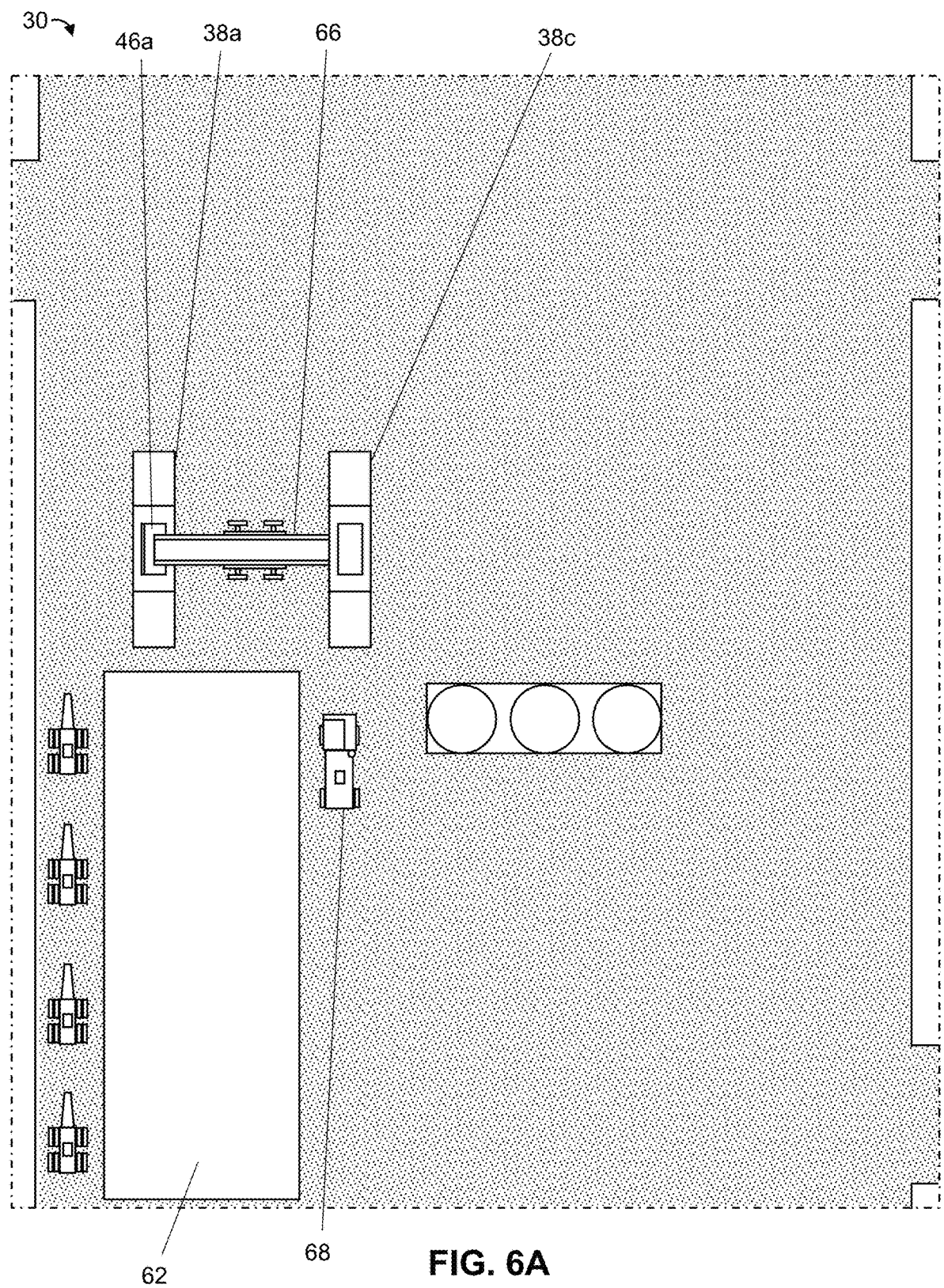
FIG. 6A illustrates a step of some of the present methods in which proppant is transferred from the third trailer of FIG. 2A to the first trailer of FIG. 2A at the proppant depot.

Turning to FIG. 6A, whether or not the trailers (e.g., the first, second, and third trailers) contain proppant when transported to the proppant-loading site, some methods comprise a step of loading proppant into the container(s) of the first trailer and into the container(s) of the second trailer at the proppant-loading site. After the loading, the container(s) of each of the first and second trailers—which can be the trailers to be transported to the wellsite in the second stage of proppant delivery—preferably contain an amount of proppant that is greater than that which could be safely and legally hauled on one of the route(s) between the proppant source and the proppant-loading site; for example, a weight of proppant in the container(s) of each of the first and second trailers after the loading can be greater than or equal to any one of, or between any two of, 28, 29, 30, 31, 32, 33, 34, 35, 36, 37, 38, 39, or 40 tons (e.g., greater than or equal to 30 tons or greater than or equal to 35 tons). Such heavy loads of proppant may allow more proppant to be delivered to the wellsite per haul and thus increase the rate of proppant delivery. However, in other embodiments, a weight of proppant in the container(s) of each of the first and second trailers after the loading can be within the above-described conventional levels, such as at least 20 tons; even if the trailers hold conventional amounts of proppant, a long combination vehicle comprising multiples ones of the trailers can transport more proppant (e.g., at least 40 tons) in one haul than that which can be transported in conventional systems.

As shown, loading proppant into the container(s) of each of the first and second trailers can comprise transferring proppant from at least one of the container(s) of the third trailer—which, as explained above, can contain proppant from the proppant source—to the container(s) of each of the first and second trailers. This proppant transfer can be performed using a conveyor (e.g., 66) at the proppant-loading site (e.g., proppant depot). For example, one end of the conveyor can be positioned under at least one of the container(s) of the third trailer, such as under a lower gate (e.g., 46b) of the container, and proppant can be discharged from the container (e.g., by moving the lower gate from the closed state to the open state). For each of the container(s) of each of the first and second trailers, the other end of the conveyor can be positioned above the container, such as above an upper gate (e.g., 46a) of the container, and proppant from the third trailer can be conveyed upward on the conveyor such that the proppant is conveyed off the conveyor and falls into the container (e.g., through the upper gate of the container, which can be moved from the closed state to the open state). Any proppant remaining in the container(s) of the third trailer can likewise be transferred to the container(s) of other ones of the trailers that are to be transported to one of the wellsites in the delivery region. After proppant is unloaded from the third trailer's container(s), the first and second trailers (and any other trailer into which proppant was loaded) can be stored in, for example, a trailer storage area (e.g., 62), and the third trailer can be transported back to the proppant source (e.g., using one of the trucks) for another load of proppant. The proppant transfer from the third trailer to at least the first and second trailers at the proppant-loading site (e.g., proppant depot) allows each of the trailers to be transported to the proppant-loading site with a lighter amount (if any) of proppant to promote safety and/or comply with weight restrictions on the public road(s) before increasing the amount of proppant in the trailers that are to be transported to one of the delivery region's wellsites (e.g., the first and second trailers) to a level that, while permissible on the routes between the proppant-loading site and wellsites, would be hazardous and/or illegal on the route(s) between the proppant source and the proppant-loading site.

The first, second, and/or third trailers need not be coupled to any of the trucks during the proppant loading process. For example, the terminal tractor can move the first, second, and/or third trailers, and optionally the conveyor, to a position in the proppant-loading site (e.g., proppant depot) for proppant transfer. Furthermore, the proppant transfer to the container(s) of each of the first and second trailers can be performed sequentially. To illustrate, the third trailer can be moved (e.g., with the terminal tractor) to the conveyor, and the first trailer can then be moved (e.g., with the terminal tractor) to the conveyor as well for proppant transfer from the third trailer to the first trailer. When that transfer is complete, the first trailer can be moved away from the conveyor (e.g., with the terminal tractor), such as into the trailer storage area. The second trailer can then be moved to the conveyor (e.g., with the terminal tractor) for proppant transfer from the third trailer to the second trailer, and when that transfer is complete the second trailer can likewise be moved away from the conveyor (e.g., with the terminal tractor), such as into the trailer storage area. This process can allow the trucks that transported the first, second, and third trailers to the proppant-loading site (e.g., proppant depot) to be used to transport other trailers to the wellsites in the delivery region or to the proppant source during the transfer of proppant from the third trailer to the first and second trailers, which can promote continuity in the proppant delivery process.

Figure 6B:
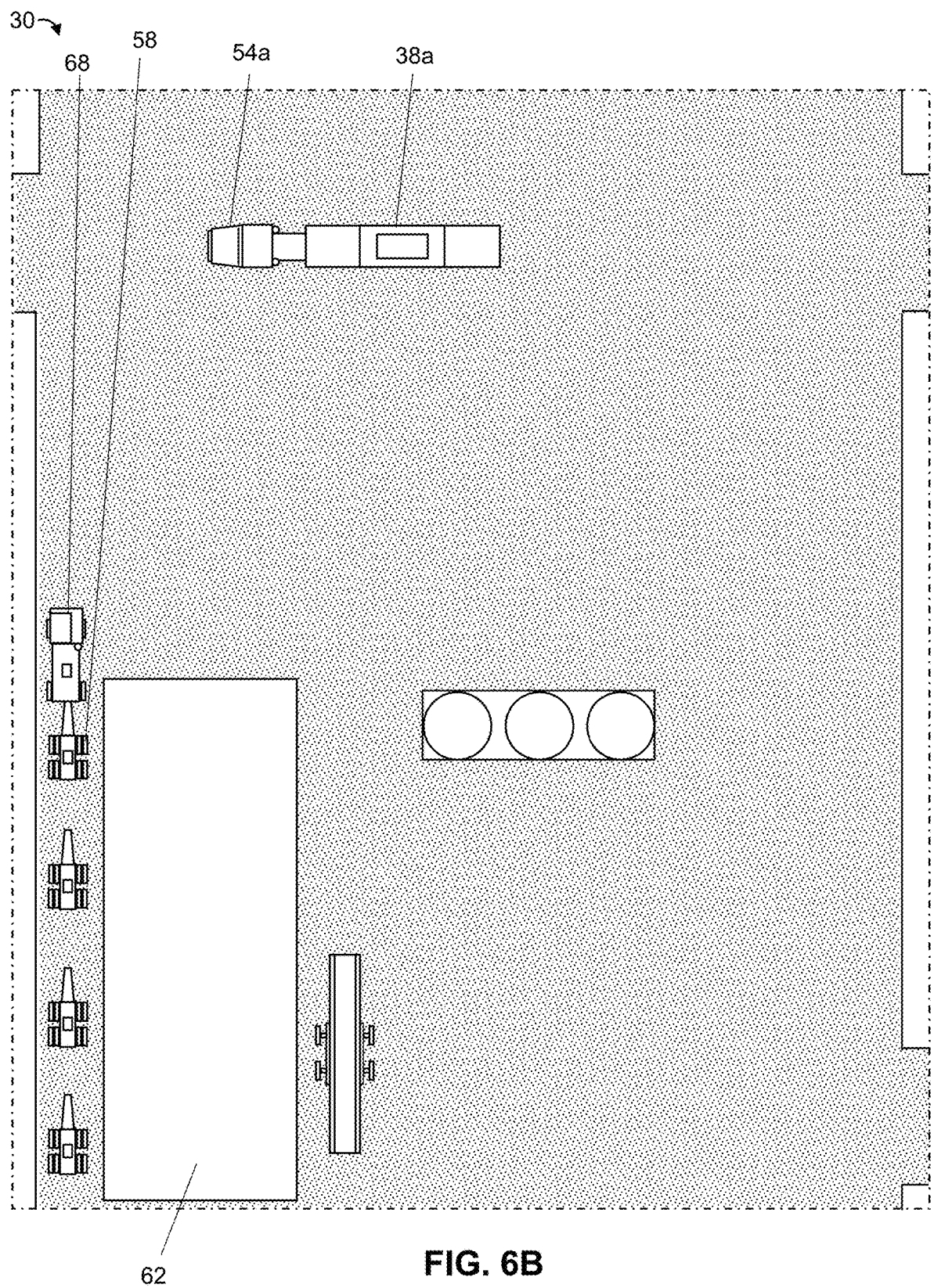
FIGS. 6B-6D illustrate steps of some of the present methods in which the first trailer of FIG. 2A is coupled to the first truck of FIG. 3A and the second trailer of FIG. 2A is coupled to the first trailer via a dolly to form a long combination vehicle after proppant is loaded into the first and second trailers.
Figure 6C:
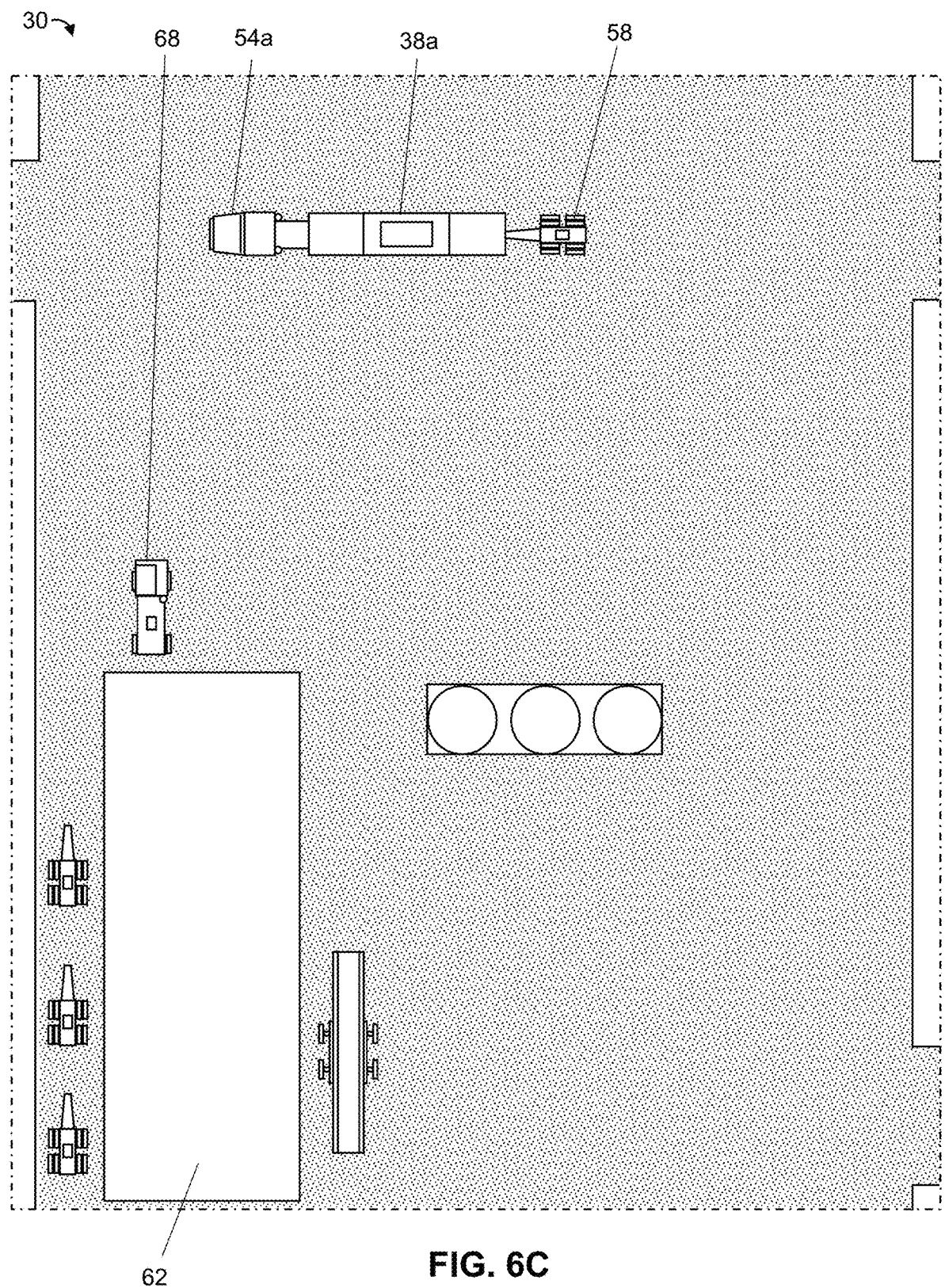
Figure 6D:
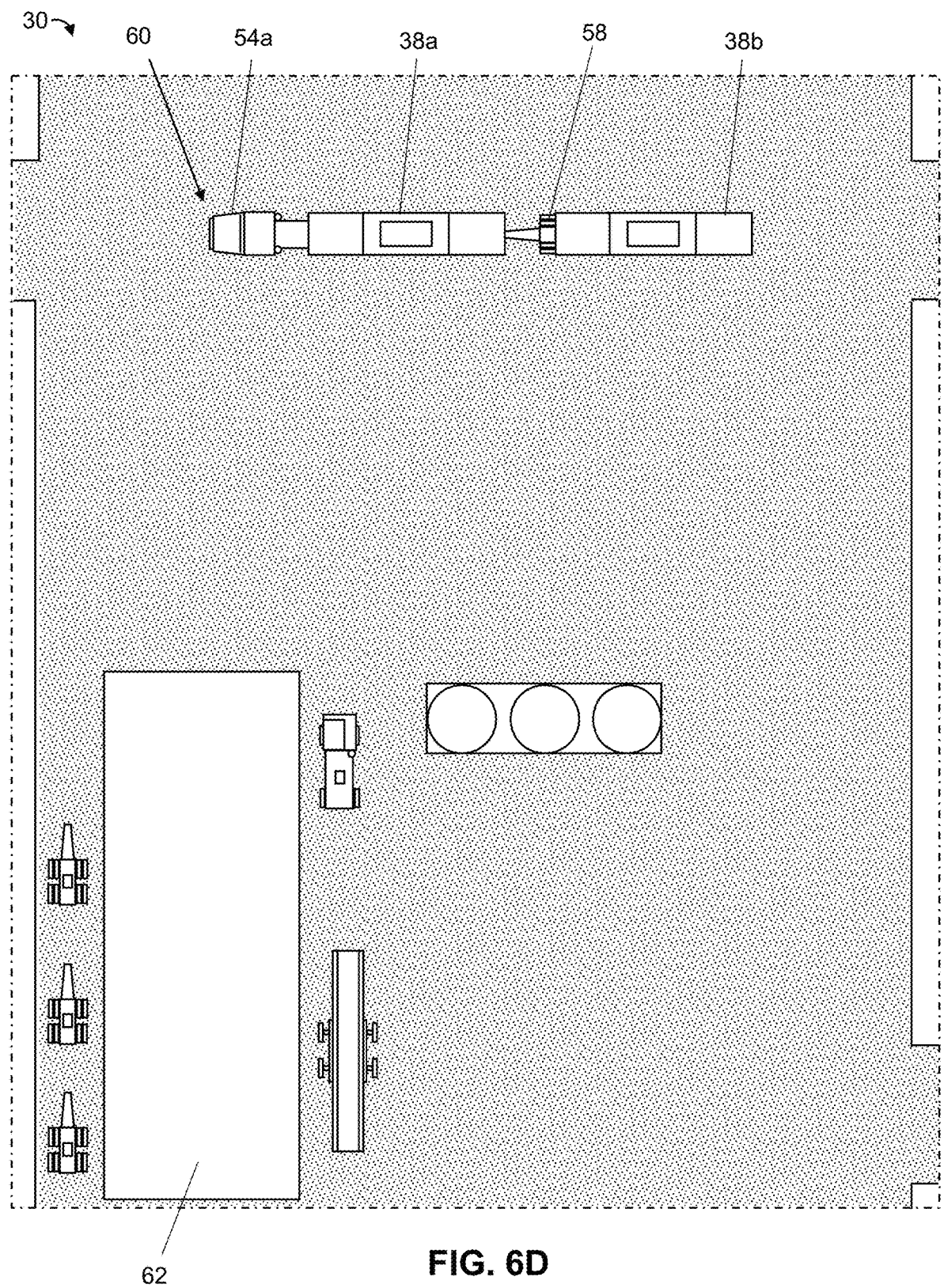

Referring to FIGS. 6B-6D, some methods comprise a step of forming a long combination vehicle (e.g., 60) that includes a first one of the trucks and the first and second trailers. The long combination vehicle can be formed at least by coupling the first trailer to the truck (FIG. 6B) and the second trailer to the first trailer (FIGS. 6C and 6D), such as via a dolly (e.g., 58) as described above. The truck of the long combination vehicle can thus tow at least the first and second trailers; in some embodiments, another trailer can be coupled to the second trailer (e.g., via a second dolly) such that the long combination vehicles includes three trailers towed by the truck. With a long combination vehicle that includes multiple trailers with proppant, a relatively large amount of proppant can be transported to the wellsite in one haul to promote faster delivery rates. For example, with the container(s) of each of the first and second trailers holding at least 28 tons (e.g., at least 30 tons or at least 35 tons) of proppant as described above and the long combination vehicle comprising both the first and second trailers, the long combination vehicle can transport at least 56 tons (e.g., at least 60 tons or at least 70 tons) of proppant. And with the long-combination vehicle comprising more than two of the trailers (e.g., three of the trailers), even more proppant, such as at least 84 tons (e.g., at least 90 tons or at least 105 tons) can be transported.

In the embodiment shown, the long combination vehicle can be formed in the proppant-loading site (e.g., proppant depot), such as after proppant is loaded into the container(s) of each of the first and second trailers. For example, the first trailer can be moved out of the trailer storage area (e.g., with the terminal tractor) and coupled to the first truck, and the dolly can be moved and coupled to the first trailer (e.g., with the terminal tractor) (FIGS. 6B and 6C). The second trailer can then be moved out of the trailer storage area (e.g., with the terminal tractor) and coupled to the dolly (FIG. 6D). In other embodiments, however, the long combination vehicle can be formed before proppant is loaded into the container(s) of each of the first and second trailers.

Figure 7A:
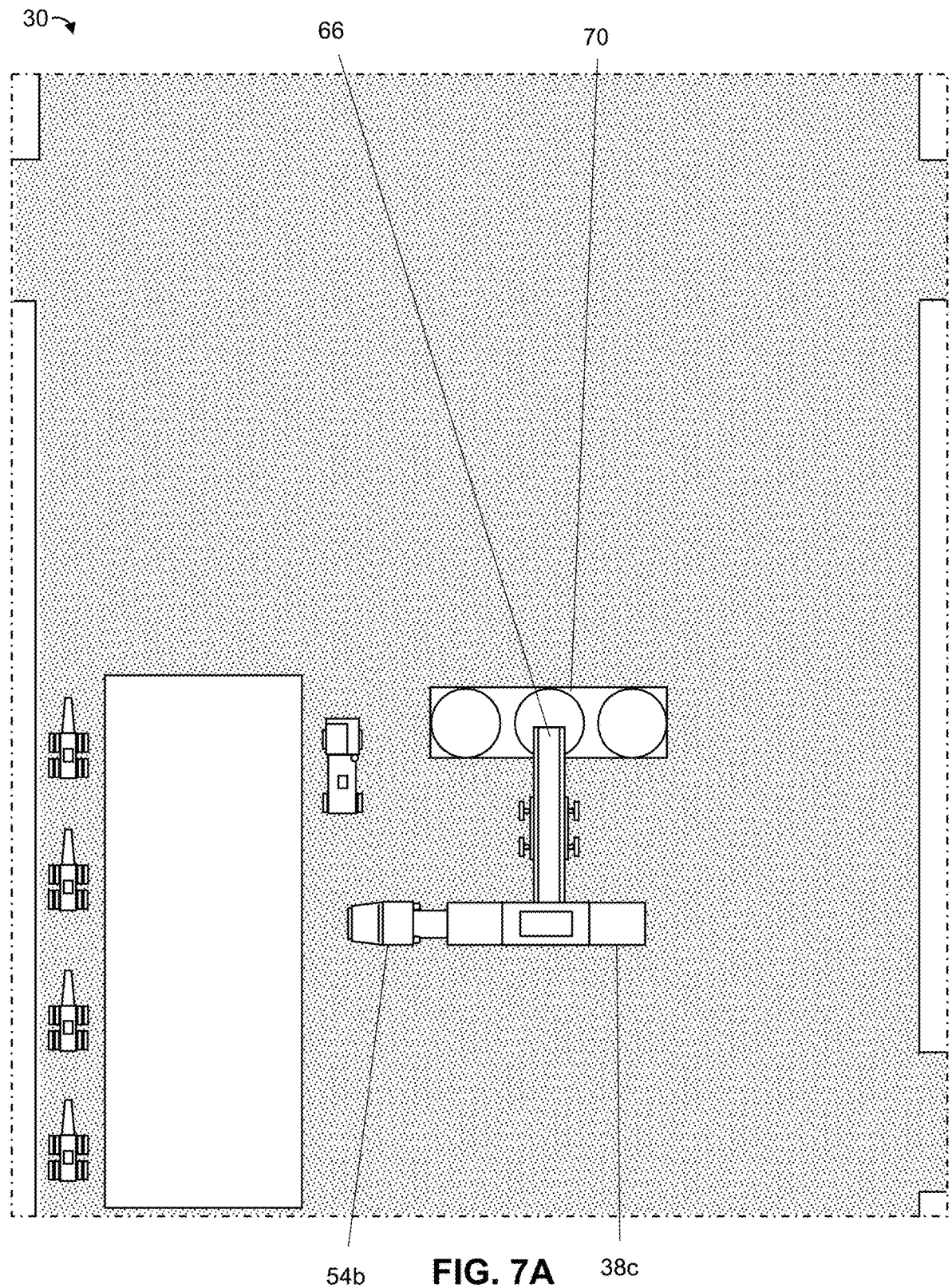
FIG. 7A illustrates a step of some of the present methods in which proppant is transferred from the third trailer of FIG. 2A into the silo of the proppant depot while the third trailer is coupled to one of the trucks of FIG. 3A.
Figure 7B:
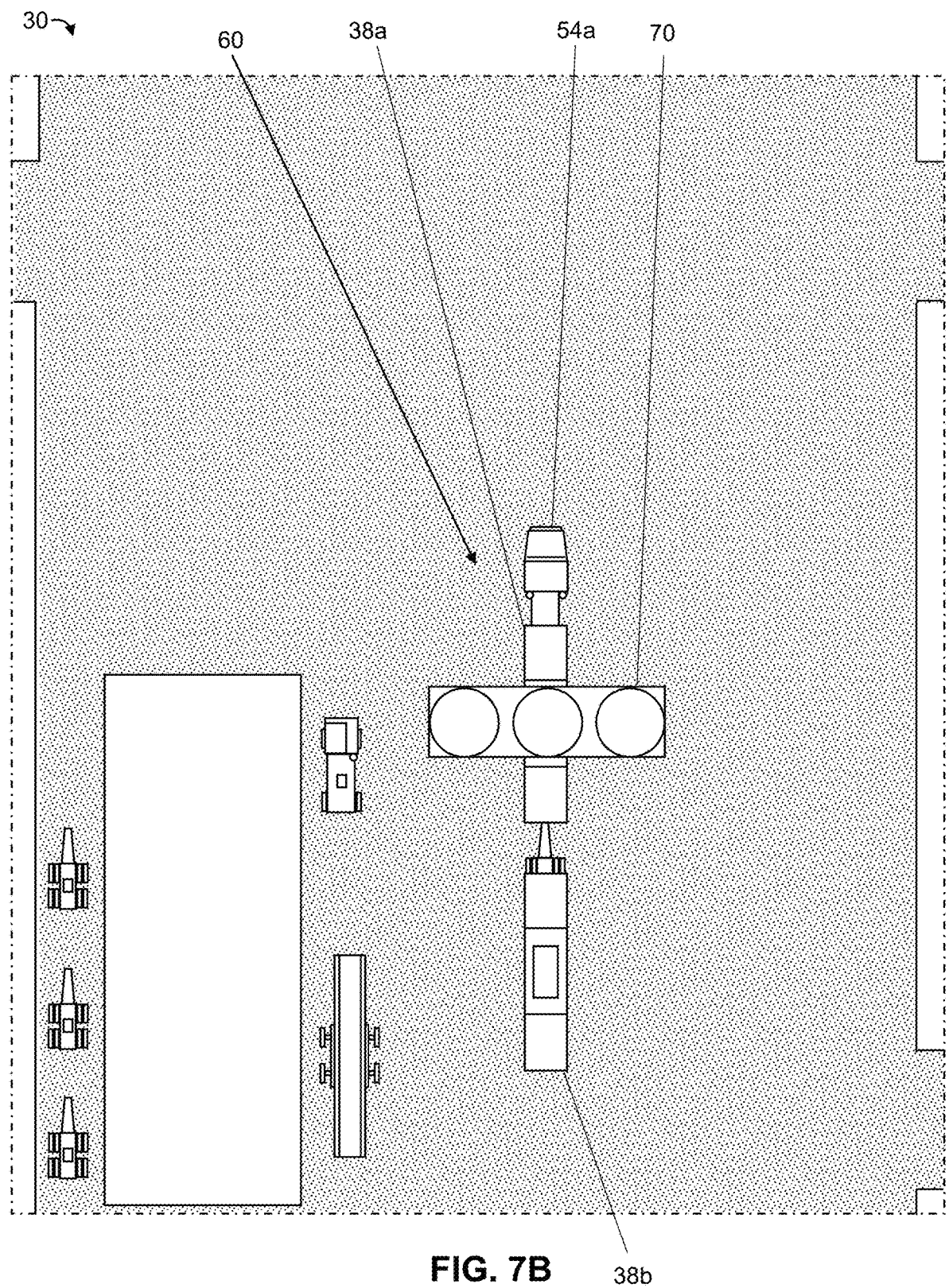
FIGS. 7B and 7C illustrate steps of some of the present methods in which proppant is loaded into the first and second trailers of FIG. 2A from the silo in the proppant depot while they are part of a long combination vehicle.
Figure 7C:
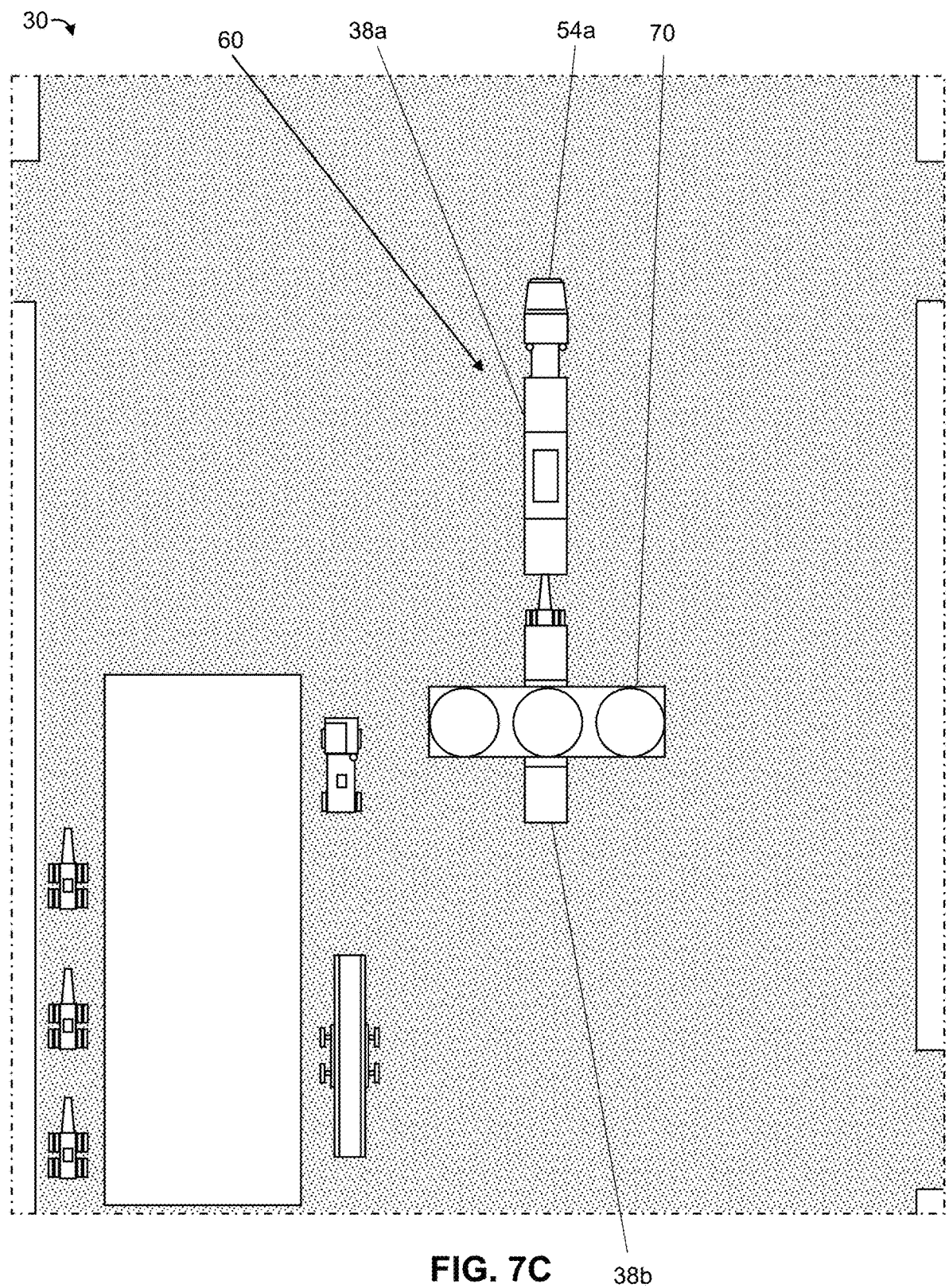

Referring to FIGS. 7A-7C, shown is another embodiment in which proppant can be loaded into the container(s) of each of the first and second trailers after the long combination vehicle is formed. As shown, the third trailer can be coupled to a second one of the trucks, which can tow the third trailer from the proppant source to the proppant-loading site (e.g., proppant depot) while the container(s) of the third trailer contain proppant as described above. Proppant can be transferred from the container(s) of the third trailer to a silo (e.g., 70) while the third trailer is coupled to the second truck, such as with the conveyor in the proppant-loading site (FIG. 7A). After proppant is unloaded from the third trailer, the third trailer can remain coupled to the second truck, which can tow the third trailer back to the proppant source for another load of proppant. The long combination vehicle can enter the proppant-loading site, such as after delivering proppant to one of the wellsites in the delivery region. In the proppant-loading site, proppant can be transferred from the silo to the container(s) of each of the first and second trailers while the second trailer is coupled to the first trailer and the first trailed is coupled to the first truck (FIGS. 7B and 7C). For example, for each of the container(s) of the first trailer, the long combination vehicle can drive under the silo such that the container (e.g., the upper gate thereof) underlies the silo, which can then discharge proppant that can fall into the container (FIG. 7B). The same can then be done for each of the container(s) of the second trailer (FIG. 7C). This process advantageously allows proppant to be loaded into the container(s) of each of the first and second trailers without disconnecting the trailers from the trucks.

Figure 8A:
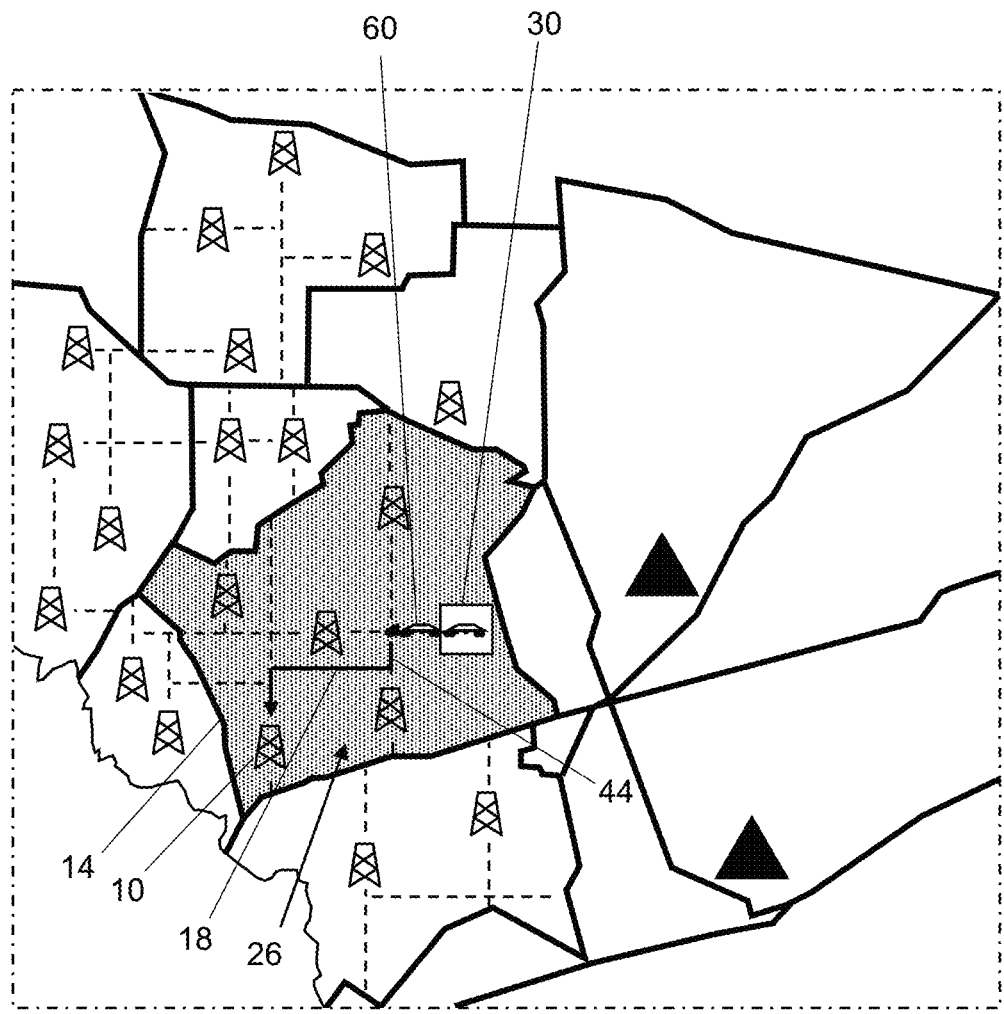
FIGS. 8A and 8B illustrate a step of some of the present methods in which the long combination vehicle drives from the proppant depot to a wellsite after proppant is loaded into the first and second trailers of the long combination vehicle without driving on a public road.
Figure 8B:
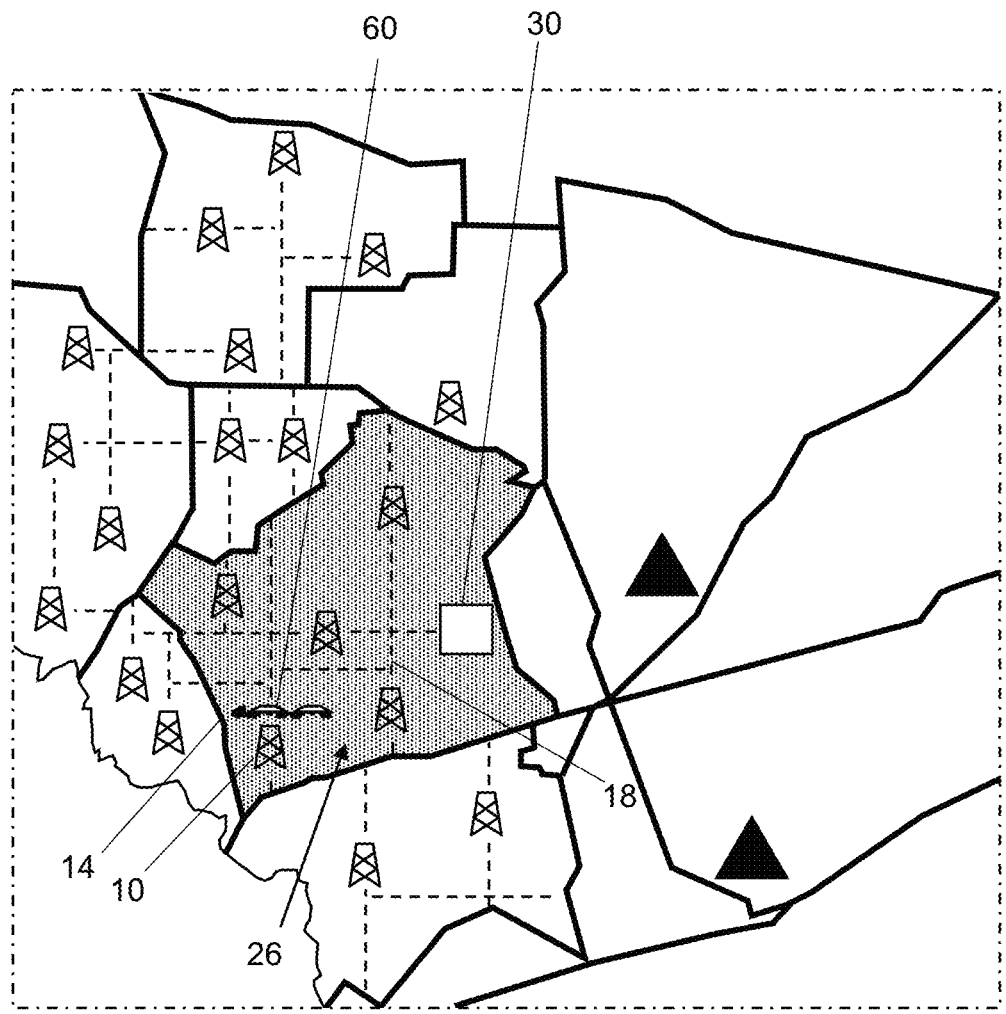

Turning now to FIGS. 8A and 8B, some methods comprise driving the long combination vehicle from the proppant-loading site to the wellsite after proppant is loaded into the container(s) of each of the first and second trailers at the proppant-loading site. As described above, little to none of each of the routes between the proppant-loading site and the wellsites in the delivery region is on a public road. Accordingly, as illustrated by arrow 44, less than or equal to any one of, or between any two of, 1%, 0.9%, 0.8%, 0.7%, 0.6%, 0.5%, 0.4%, 0.3%, 0.2%, 0.1%, 0.05%, or 0.01% (down to and including none) (e.g., less than or equal to 0.1% or 0.01%) of a distance that the long combination vehicle drives when driving from the proppant-loading site to the wellsite can be on a public road; in the embodiment shown, the long combination vehicle does not drive on a public road. By travelling entirely or almost entirely on private land that does not have the same level of traffic as the public road(s), the long combination vehicle can safely and legally transport a heavy load of proppant—such as at least 40 tons of proppant when the container(s) of each of the first and second trailer hold at least 20 tons of proppant, or preferably at least 60 tons or at least 70 tons of proppant when the container(s) of each of the first and second trailers hold at least 30 tons or at least 35 tons, respectively, of proppant—to promote faster rates of proppant delivery. At the wellsite, proppant (e.g., sand) can be unloaded from the trailers, such as into a proppant storage system at the wellsite like a silo, and the long combination vehicle can drive back to the proppant-loading site where the first and second trailers can be, for example, reloaded with proppant for another delivery or disconnected to be sent back to the proppant source. While transporting proppant from the proppant-loading site to the wellsite with the long combination vehicle can best promote faster rates of proppant delivery, in other embodiments delivery can be achieved by driving a truck towing a single one of the trailers whose container(s) contain a higher-than-normal weight of proppant, such as at least 30 tons (e.g., at least 35 tons) of proppant.

Figure 9A:
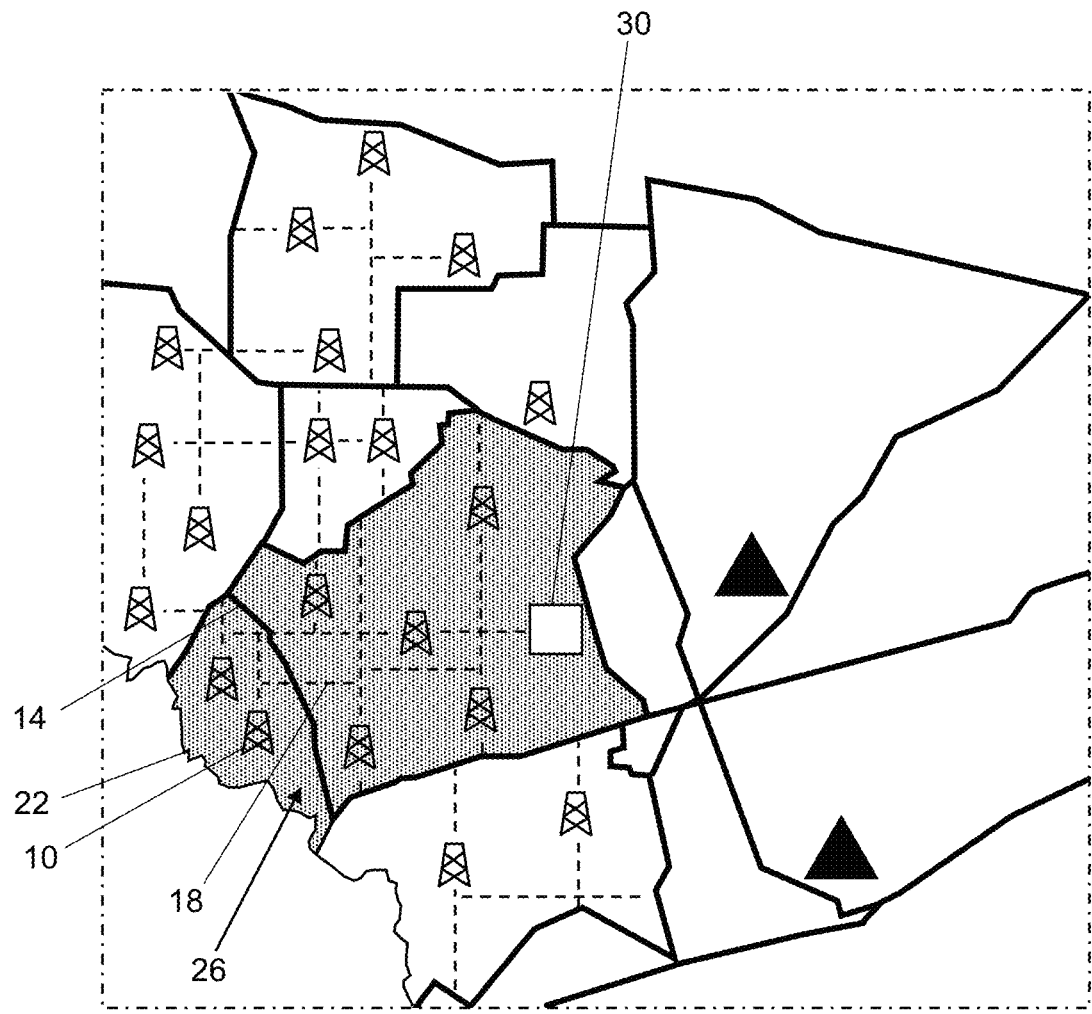
FIG. 9A illustrates another embodiment in which there is a public road in the delivery region such that, for at least one of the wellsites in the delivery region, the route between the proppant depot and the wellsite includes a portion of the public road.
Figure 9B:
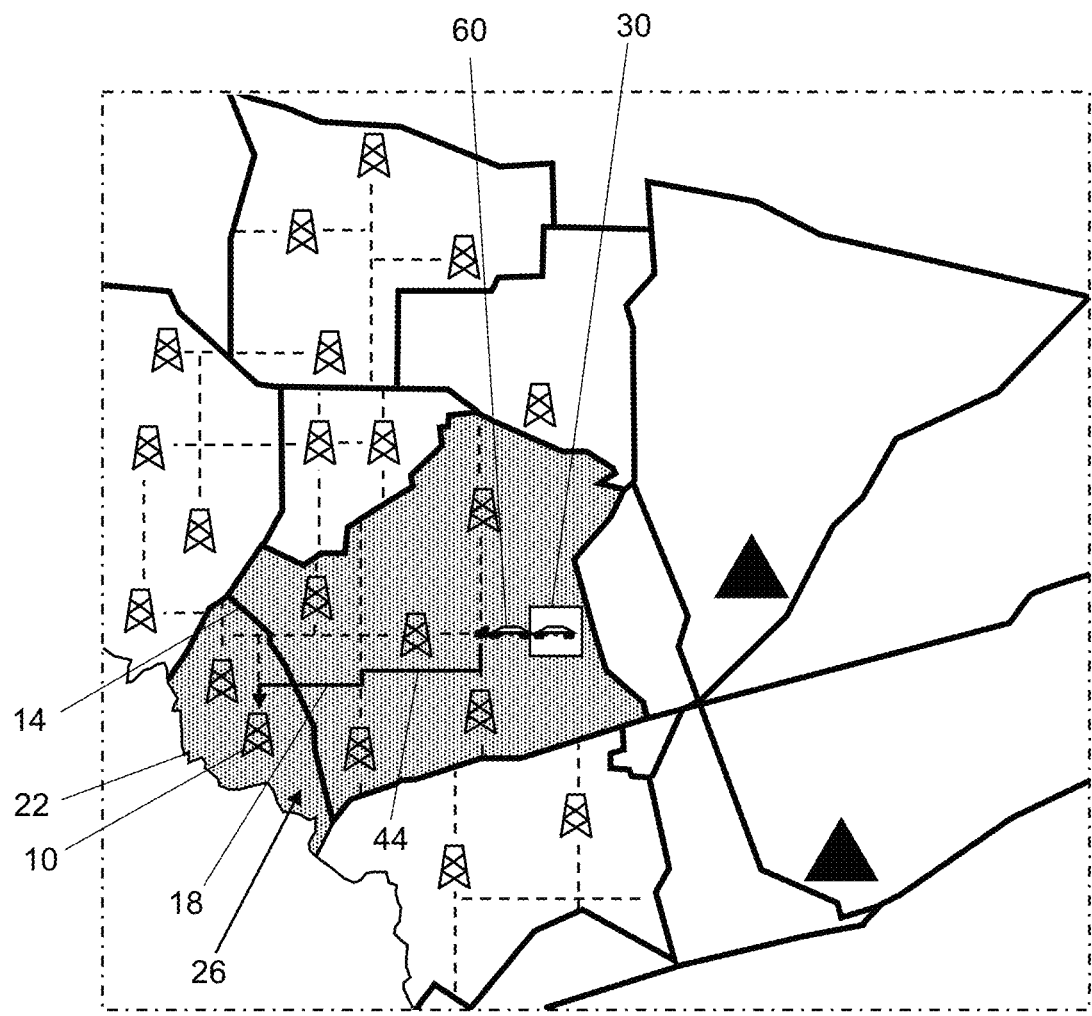
FIGS. 9B and 9C illustrate a step of some of the present methods in which the long combination vehicle drives from the proppant depot to a wellsite after proppant is loaded into the first and second trailers of the long combination vehicle, where a small portion of the long combination vehicle's route is over the public road that is in the delivery region.
Figure 9C:
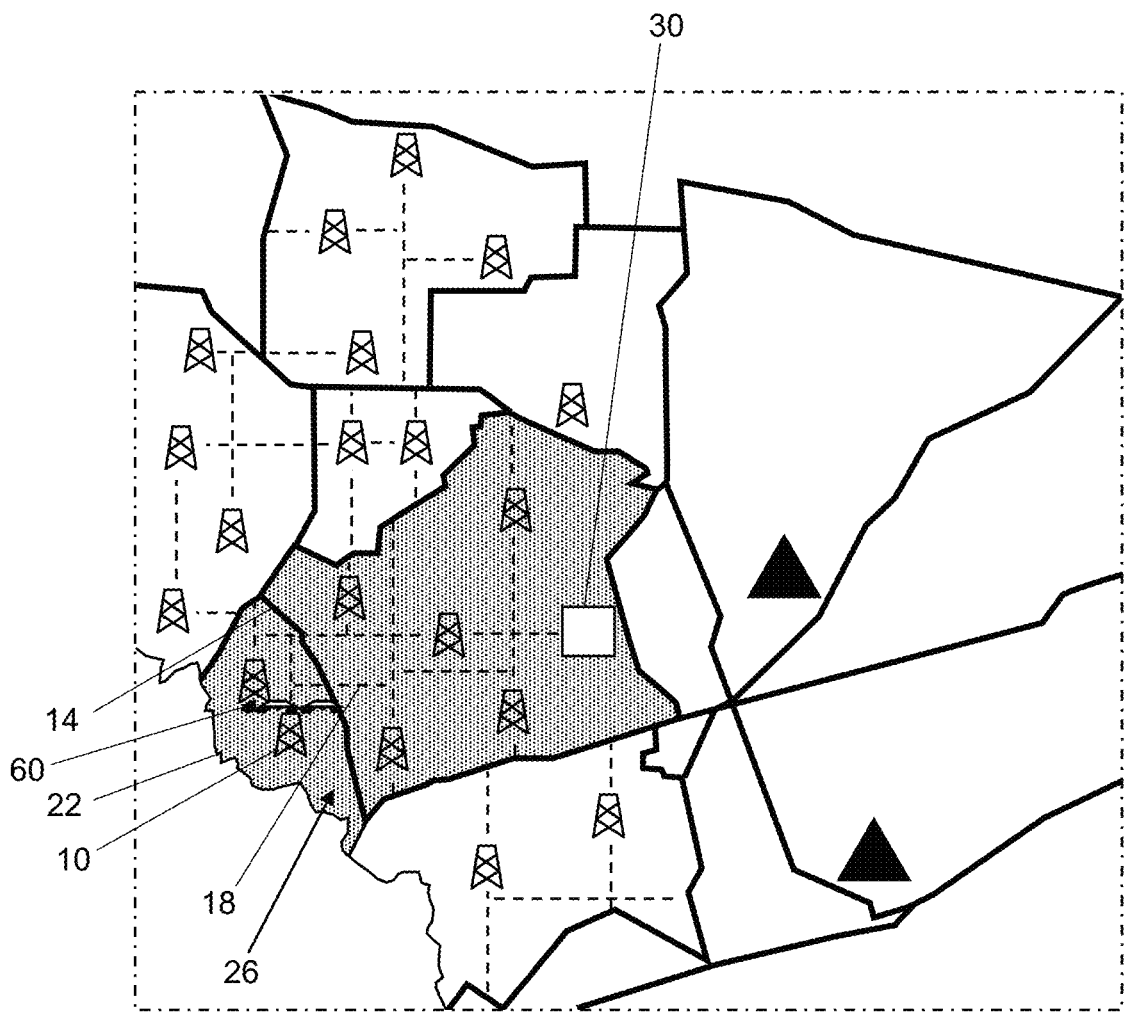

Referring to FIGS. 9A-9C, shown are other embodiments of the present systems and methods that are substantially the same as those described above, the primary exception being that delivery region 26 includes an additional portion of the area containing the petroleum reservoir(s) such that at least one public road 14 is disposed in the delivery region. Like the above-described embodiments, in the embodiment shown one or more public road(s) 14 are disposed along at least a majority of the perimeter of delivery region 26 such that trailers 38a-38c can be transported to proppant-loading site 30 (e.g., from at least one proppant source 34) in the above-described manner, although a natural feature 22 (e.g., a river or mountain range) can also be disposed along at least a portion of the delivery region's perimeter. However, with at least one public road 14 disposed in delivery region 26, for at least one of wellsites 10 in the delivery region, the route between proppant-loading site 30 and the wellsite can include a small portion of the public road, such as a portion that must be crossed to drive from one private road 18 to another, which is pertinent to the second stage of proppant delivery in which the above-described heavy loads of proppant are transported to the wellsite. With transit occurring over only a small portion of a public road 14, the transportation of heavy loads on that portion may not pose a meaningful safety risk. Furthermore, in view of weight restrictions on certain public roads 14, proppant-loading site 30 can be positioned in a delivery region 26 in which the public road that is to be traversed to reach a wellsite 10 in the delivery region can be a road like a county road that—if in the United States of America—is not part of the National Network or the National Highway System. For such a public road 14, it can be easier to obtain permission to traverse a small portion of the road with a heavier-than-normal payload. Accordingly, in some methods, while the long combination vehicle may drive on a portion of a public road— while remaining off of a road that is part of the National Network or the National Highway System—when the long combination vehicle drives from the proppant-loading site to the wellsite (FIGS. 9B and 9C), the long combination vehicle can still safely transport more proppant in one haul than in conventional systems where proppant is transported directly from the proppant source to the wellsite.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the products, systems, and methods are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method of transporting proppant to a wellsite that includes one or more wells, the method comprising:
   transporting a plurality of trailers to a proppant-loading site, each of the trailers comprising one or more containers;
   at the proppant-loading site, loading proppant into the container(s) of each of first and second ones of the trailers;
   forming a long combination vehicle that includes a truck and the first and second trailers at least by coupling:
      the first trailer to the truck; and
      the second trailer to the first trailer; and
   driving the long combination vehicle from the proppant-loading site to the wellsite after proppant is loaded into the container(s) of each of the first and second trailers at the proppant-loading site, wherein when the long combination vehicle drives from the proppant-loading site to the wellsite less than 1% of a distance that the long combination vehicle drives is on a public road;
   wherein:
   the proppant-loading site is a proppant depot; and
   for each of the first and second trailers, the container(s) of the trailer contain proppant when the trailer is transported to the proppant depot and before proppant is loaded into the container(s) at the proppant depot.

2. The method of claim 1, wherein for each of the first and second trailers:
   a weight of proppant in the container(s) of the trailer before proppant is loaded into the container(s) at the proppant depot is between 10 and 27 tons; and
   a weight of proppant in the container(s) of the trailer after proppant is loaded into the container(s) at the proppant depot is greater than or equal to 30 tons.

3. The method of claim 1, wherein:
   the container(s) of a third one of the trailers contain proppant when the third trailer is transported to the proppant depot; and
   loading proppant into the container(s) of each of the first and second trailers at the proppant depot comprises transferring proppant from at least one of the container(s) of the third trailer to the container(s) of each of the first and second trailers.

4. The method of claim 3, wherein a weight of proppant in the container(s) of the third trailer before proppant is transferred from at least one of the container(s) of the third trailer to the container(s) of each of the first and second trailers is between 10 and 27 tons.

5. The method of claim 3, wherein:
   each of the container(s) of each of the trailers comprises a lower gate movable between:
      an open state in which proppant is permitted to exit the container downwardly through the lower gate; and a closed state in which proppant is not permitted to exit the container through the lower gate; and transferring proppant from at least one of the container(s) of the third trailer to the container(s) of each of the first and second trailers comprises:

for at least one of the container(s) of the third trailer, moving the lower gate of the container from the closed state to the open state such that proppant exits the container; and for each of the container(s) of each of the first and second trailers, conveying proppant from the third trailer upward on a conveyor such that the proppant is conveyed off the conveyor and falls into the container.

6. The method of claim 5, wherein:

each of the container(s) of each of the trailers comprises an upper gate movable between:

an open state in which proppant is permitted to enter the container downwardly through the upper gate; and a closed state in which proppant is not permitted to enter the container through the upper gate; and transferring proppant from at least one of the container(s) of the third trailer to the container(s) of each of the first and second trailers comprises, for each of the container(s) of each of the first and second trailers, moving the upper gate of the container from the closed state to the open state such that the proppant conveyed off the conveyor falls into the container through the upper gate.

7. The method of claim 1, wherein:

the truck of the long combination vehicle is a first truck;

when a third one of the trailers is transported to the proppant depot:

the third trailer is coupled to a second truck; and the container(s) of the third trailer contain proppant; and loading proppant into the container(s) of each of the first and second trailers at the proppant depot comprises:

transferring proppant from the container(s) of the third trailer to a silo while the third trailer is coupled to the second truck; and transferring proppant from the silo to the container(s) of each of the first and second trailers while the first trailer is coupled to the first truck and the second trailer is coupled to the first trailer.

8. The method of claim 1, wherein when the long combination vehicle drives from the proppant-loading site to the wellsite, for each of the first and second trailers, a weight of proppant in the container(s) of the trailer is greater than 20 tons.

9. The method of claim 8, wherein:

the proppant-loading site and the wellsite are in the United States of America; and when the long combination vehicle drives from the proppant-loading site to the wellsite, the long combination vehicle:

does not drive on a road that is part of the National Network; and does not drive on a road that is part of the National Highway System.

10. The method of claim 8, wherein when the long combination vehicle drives from the proppant-loading site to the wellsite, the long combination vehicle does not drive on a public road.

11. The method of claim 8, wherein for each of the first and second trailers, a weight of proppant in the container(s) of the trailer is greater than or equal to 30 tons when the long combination vehicle drives from the proppant-loading site to the wellsite.

12. The method of claim 8, wherein:

the wellsite is a first one of a plurality of wellsites that each include one or more wells;

the wellsites and the proppant-loading site are disposed in a delivery region, wherein one or more public roads are disposed along at least a majority of a perimeter of the delivery region; and when the long combination vehicle drives from the proppant-loading site to the wellsite, the long combination vehicle remains within the delivery region.

13. The method of claim 12, wherein the wellsites include between 5 and 50 wellsites.

14. The method of claim 12, wherein an area of the delivery region is between 200 and 1800 square miles.

15. A proppant delivery system comprising:

a plurality of trailers, each:

comprising one or more containers configured to hold proppant; and configured to be coupled to at least one other of the trailers;

a plurality of trucks, each configured to be coupled to one of the trailers; and a proppant depot that is:

configured to contain multiple ones of the trailers and multiples ones of the trucks; and disposed in a delivery region that has:

a plurality of wellsites that each include one or more wells; and a plurality of routes along which the trucks can drive between the proppant depot and the wellsites, wherein for each of the routes less than 1% of a distance of the route is on a public road; and one or more conveyors disposed at the proppant depot, each of the conveyor(s) configured to transfer proppant from one of the trailers to another one of the trailers.

16. The proppant delivery system of claim 15, wherein:

the delivery region is in the United States of America; and each of the routes:

does not include a portion of a road that is part of the National Network; and does not include a portion of a road that is part of the National Highway System.

17. The proppant delivery system of claim 15, wherein each of the routes does not include a portion of a public road.

18. The proppant delivery system of claim 15, wherein:

one or more public roads are disposed along at least a majority of a perimeter of the delivery region; and none of the routes include a portion of the public road(s) that are disposed along at least a majority of the perimeter of the delivery region.

19. The proppant delivery system of claim 18, wherein the wellsites include between 5 and 50 wellsites.

20. The proppant delivery system of claim 18, wherein an area of the delivery region is between 200 and 1800 square miles.

21. The proppant delivery system of claim 15, wherein the proppant depot comprises one or more silos.

22. The proppant delivery system of claim 15, wherein each of the container(s) of each of the trailers comprises a lower gate movable between:

an open state in which proppant is permitted to exit the container downwardly through the lower gate; and a closed state in which proppant is not permitted to exit the container through the lower gate.

23. The proppant delivery system of claim 22, wherein each of the container(s) of each of the trailers comprises an upper gate movable between:
- an open state in which proppant is permitted to enter the container downwardly through the upper gate; and
- a closed state in which proppant is not permitted to enter the container through the upper gate.

24. The proppant delivery system of claim 15, wherein a payload capacity of the container(s) of each of the trailers is at least 30 tons.

25. The proppant delivery system of claim 24, wherein a payload capacity of the container(s) of each of the trailers is within 10% of the payload capacity of the container(s) of each other of the trailers.

26. A method of transporting proppant to a wellsite that includes one or more wells, the method comprising:
- transporting a plurality of trailers to a proppant-loading site, each of the trailers comprising one or more containers;
- at the proppant-loading site, loading proppant into the container(s) of each of first and second ones of the trailers;
- forming a long combination vehicle that includes a truck and the first and second trailers at least by coupling:
  - the first trailer to the truck; and
  - the second trailer to the first trailer; and
- driving the long combination vehicle from the proppant-loading site to the wellsite after proppant is loaded into the container(s) of each of the first and second trailers at the proppant-loading site, wherein when the long combination vehicle drives from the proppant-loading site to the wellsite less than 1% of a distance that the long combination vehicle drives is on a public road;

wherein:
- the proppant-loading site is a proppant depot;
- the container(s) of a third one of the trailers contain proppant when the third trailer is transported to the proppant depot; and
- loading proppant into the container(s) of each of the first and second trailers at the proppant depot comprises transferring proppant from at least one of the container(s) of the third trailer to the container(s) of each of the first and second trailers.

27. The method of claim 26, wherein:
each of the container(s) of each of the trailers comprises a lower gate movable between:
- an open state in which proppant is permitted to exit the container downwardly through the lower gate; and
- a closed state in which proppant is not permitted to exit the container through the lower gate; and transferring proppant from at least one of the container(s) of the third trailer to the container(s) of each of the first and second trailers comprises:
- for at least one of the container(s) of the third trailer, moving the lower gate of the container from the closed state to the open state such that proppant exits the container; and
- for each of the container(s) of each of the first and second trailers, conveying proppant from the third trailer upward on a conveyor such that the proppant is conveyed off the conveyor and falls into the container.

28. The method of claim 27, wherein:
each of the container(s) of each of the trailers comprises an upper gate movable between:
- an open state in which proppant is permitted to enter the container downwardly through the upper gate; and
- a closed state in which proppant is not permitted to enter the container through the upper gate; and transferring proppant from at least one of the container(s) of the third trailer to the container(s) of each of the first and second trailers comprises, for each of the container(s) of the first and second trailers, moving the upper gate of the container from the closed state to the open state such that the proppant conveyed off the conveyor falls into the container through the upper gate.

29. A method of transporting proppant to a wellsite that includes one or more wells, the method comprising:
- transporting a plurality of trailers to a proppant-loading site, each of the trailers comprising one or more containers;
- at the proppant-loading site, loading proppant into the container(s) of each of first and second ones of the trailers;
- forming a long combination vehicle that includes a truck and the first and second trailers at least by coupling:
  - the first trailer to the truck; and
  - the second trailer to the first trailer; and
- driving the long combination vehicle from the proppant-loading site to the wellsite after proppant is loaded into the container(s) of each of the first and second trailers at the proppant-loading site, wherein when the long combination vehicle drives from the proppant-loading site to the wellsite less than 1% of a distance that the long combination vehicle drives is on a public road;

wherein:
the proppant-loading site is a proppant depot;
the truck of the long combination vehicle is a first truck;
when a third one of the trailers is transported to the proppant depot:
- the third trailer is coupled to a second truck; and
- the container(s) of the third trailer contain proppant; and loading proppant into the container(s) of each of the first and second trailers at the proppant depot comprises:
- transferring proppant from the container(s) of the third trailer to a silo while the third trailer is coupled to the second truck; and
- transferring proppant from the silo to the container(s) of each of the first and second trailers while the first trailer is coupled to the first truck and the second trailer is coupled to the first trailer.

30. The method of claim 29, wherein when the long combination vehicle drives from the proppant-loading site to the wellsite, for each of the first and second trailers, a weight of proppant in the container(s) of the trailer is greater than 20 tons.

* * * * *

UNITED STATES PATENT AND TRADEMARK OFFICE
CERTIFICATE OF CORRECTION

| | | |
|---|---|---|
| PATENT NO. | : 11,939,147 B1 | Page 1 of 1 |
| APPLICATION NO. | : 18/305958 | |
| DATED | : March 26, 2024 | |
| INVENTOR(S) | : Christopher R. Scholla et al. | |

It is certified that error appears in the above-identified patent and that said Letters Patent is hereby corrected as shown below:

In the Claims

In the eighth Line of Claim 15, delete "and".

Signed and Sealed this
Sixteenth Day of July, 2024

*Katherine Kelly Vidal*

Katherine Kelly Vidal
*Director of the United States Patent and Trademark Office*